(12) United States Patent
Ozawa

(10) Patent No.: US 8,320,583 B2
(45) Date of Patent: Nov. 27, 2012

(54) NOISE REDUCING DEVICE AND NOISE DETERMINING METHOD

(75) Inventor: Kazuhiko Ozawa, Kanagawa (JP)

(73) Assignee: Sony Corporation, Tokyo (JP)

( * ) Notice: Subject to any disclaimer, the term of this patent is extended or adjusted under 35 U.S.C. 154(b) by 301 days.

(21) Appl. No.: 12/718,508

(22) Filed: Mar. 5, 2010

(65) Prior Publication Data
US 2010/0260353 A1   Oct. 14, 2010

(30) Foreign Application Priority Data

Apr. 13, 2009   (JP) ................................. 2009-097189

(51) Int. Cl.
*H04B 15/00*   (2006.01)
(52) U.S. Cl. ...................................... 381/94.3; 381/94.2
(58) Field of Classification Search ........ 381/71.1–71.4, 381/71.11–71.14, 94.1–94.8, 170; 700/94
See application file for complete search history.

(56) References Cited

U.S. PATENT DOCUMENTS

| | | | |
|---|---|---|---|
| 6,449,519 B1 * | 9/2002 | Kuwaoka | 700/94 |
| 6,690,805 B1 * | 2/2004 | Tsuji et al. | 381/94.1 |
| 7,978,862 B2 * | 7/2011 | Betts | 381/94.4 |
| 2010/0260354 A1 * | 10/2010 | Ozawa | 381/94.4 |

FOREIGN PATENT DOCUMENTS

| | | |
|---|---|---|
| JP | 2008-52772 | 3/2008 |
| JP | 2008-71374 | 3/2008 |
| JP | 2008-77707 | 4/2008 |

* cited by examiner

*Primary Examiner* — Xu Mei
*Assistant Examiner* — Lao Lun-See
(74) *Attorney, Agent, or Firm* — Oblon, Spivak, McClelland, Maier & Neustadt, L.L.P.

(57) ABSTRACT

A noise reducing device includes: a sound-signal input unit that inputs a sound signal; a time-to-frequency converting unit that converts the input sound signal obtained by being input by the sound-signal input unit into a frequency signal; a patterning unit that calculates, for each of divided frequencies of the frequency signal, an nth order polynomial (n is a natural number) as a polynomial for interpolating sampling points and acquires a coefficient pattern including a set of values of coefficients of respective orders of the polynomial; a matching-data storing unit that stores, in association with the divided frequencies, matching data indicating a matching range as a range of a coefficient pattern regarded as noise; and a noise determining unit that determines, on the basis of a result obtained by comparing the coefficient pattern acquired by the patterning unit and the matching range indicated by the matching data, at least presence or absence of noise occurrence at a divided frequency corresponding to data of the compared coefficient pattern.

16 Claims, 24 Drawing Sheets

FIG.9
(a) QUARTIC POLYNOMIAL
$y = 0.3 \times x^4 + 0.5 \times x^3 - 2.8 \times x^2 - 2.0 \times x + 7.0$
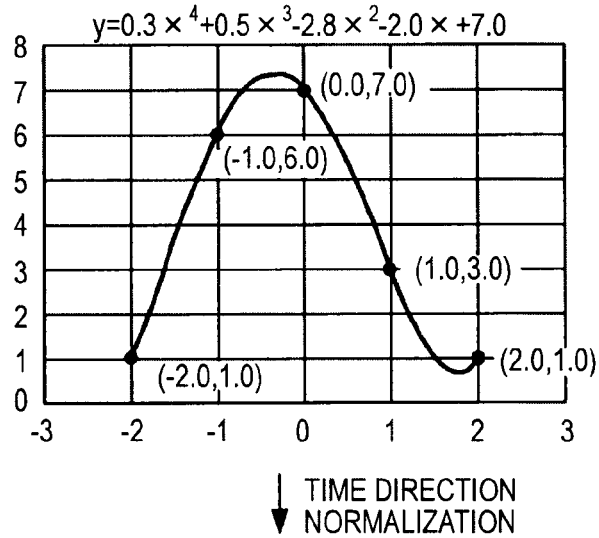
↓ TIME DIRECTION NORMALIZATION
(b) $y = 0.3 \times x^4 + 0.1 \times x^3 - 3.1 \times x^2 - 0.0 \times x + 7.3$
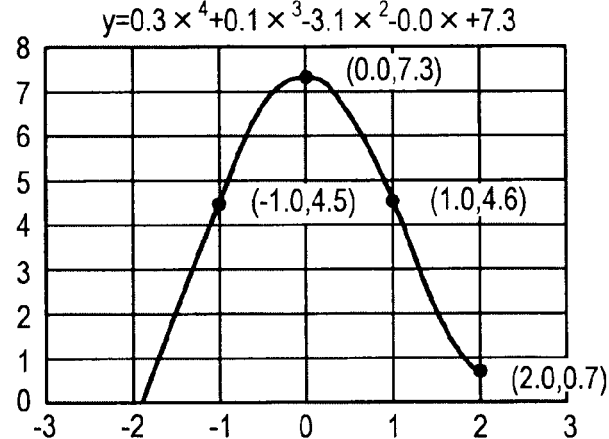
↓ AMPLITUDE DIRECTION NORMALIZATION
(c) $y = 0.3 \times x^4 + 0.1 \times x^3 - 3.1 \times x^2 - 0.0 \times x + 7.0$
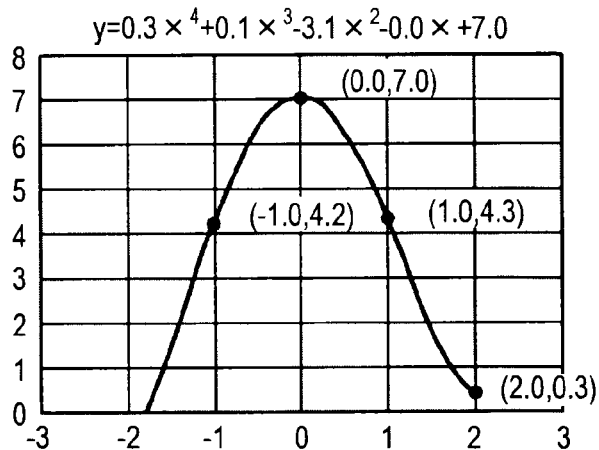

FIG.10
QUADRATIC POLYNOMIAL
(a)
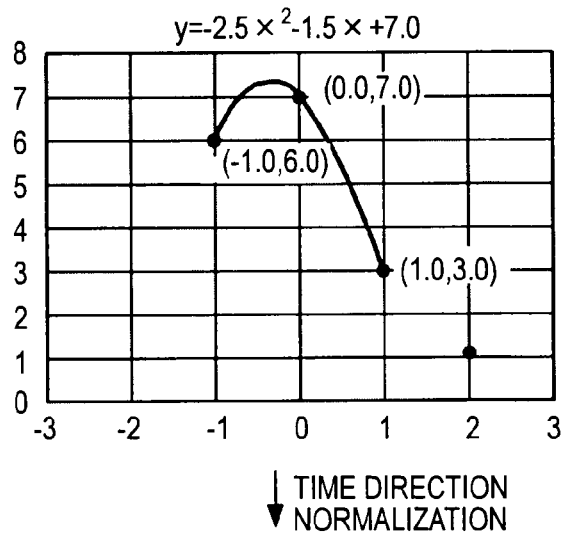
↓ TIME DIRECTION NORMALIZATION
(b)
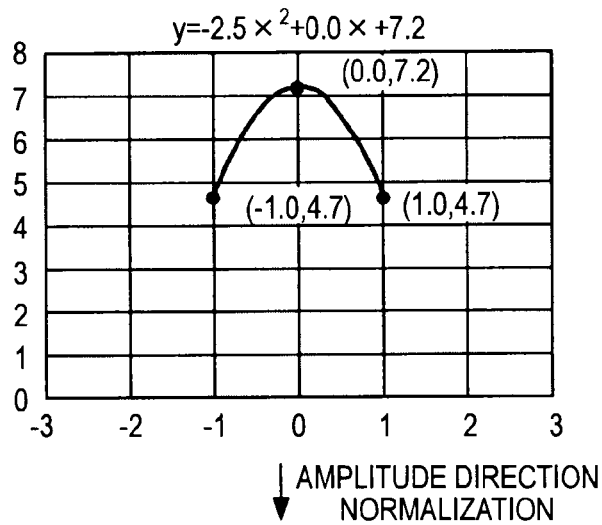
↓ AMPLITUDE DIRECTION NORMALIZATION
(c)
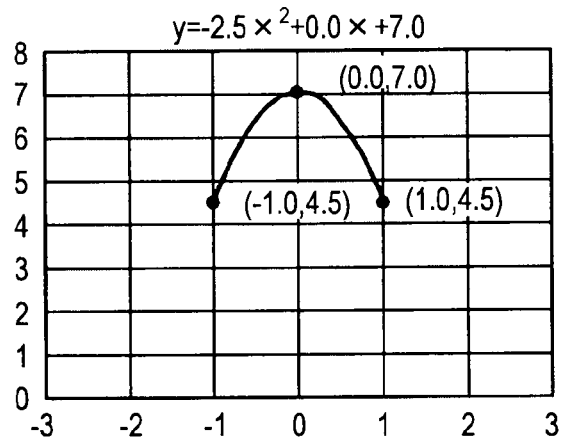

FIG.12

| DATA POSITION AFTER FFT | ACTUAL FREQUENCY (Hz) | | COEFFICIENT a | COEFFICIENT b | COEFFICIENT -c/a | COEFFICIENT c |
|---|---|---|---|---|---|---|
| 1 ~ 8 | 43.1 ~ 344.5 | UPPER LIMIT VALUE | -21 | 34 | 1.68 | 73 |
| | | LOWER LIMIT VALUE | -62 | -48 | 1.30 | 50 |
| 9 ~ 40 | 387.6 ~ 1.72k | UPPER LIMIT VALUE | -32 | 24 | 1.75 | 124 |
| | | LOWER LIMIT VALUE | -92 | -21 | 1.31 | 54 |
| 41 ~ 53 | 1.77k ~ 2.28k | UPPER LIMIT VALUE | -40 | 13 | 3.05 | 410 |
| | | LOWER LIMIT VALUE | -302 | -15 | 1.34 | 64 |
| 54 ~ 512 | 2.33k ~ 22.1k | UPPER LIMIT VALUE | — | — | — | — |
| | | LOWER LIMIT VALUE | — | — | — | — |

FIG.18
(a)
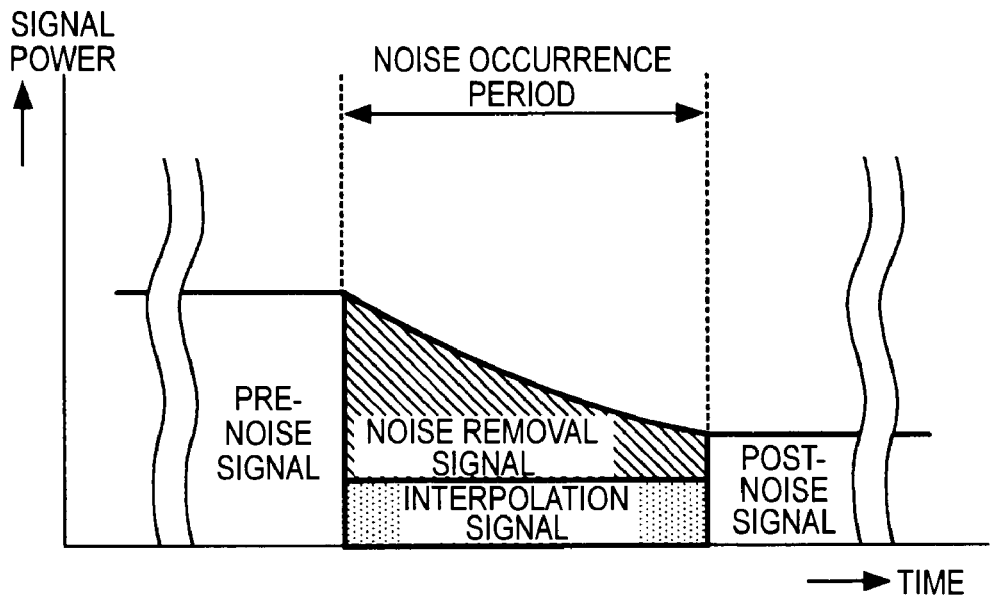
(b)
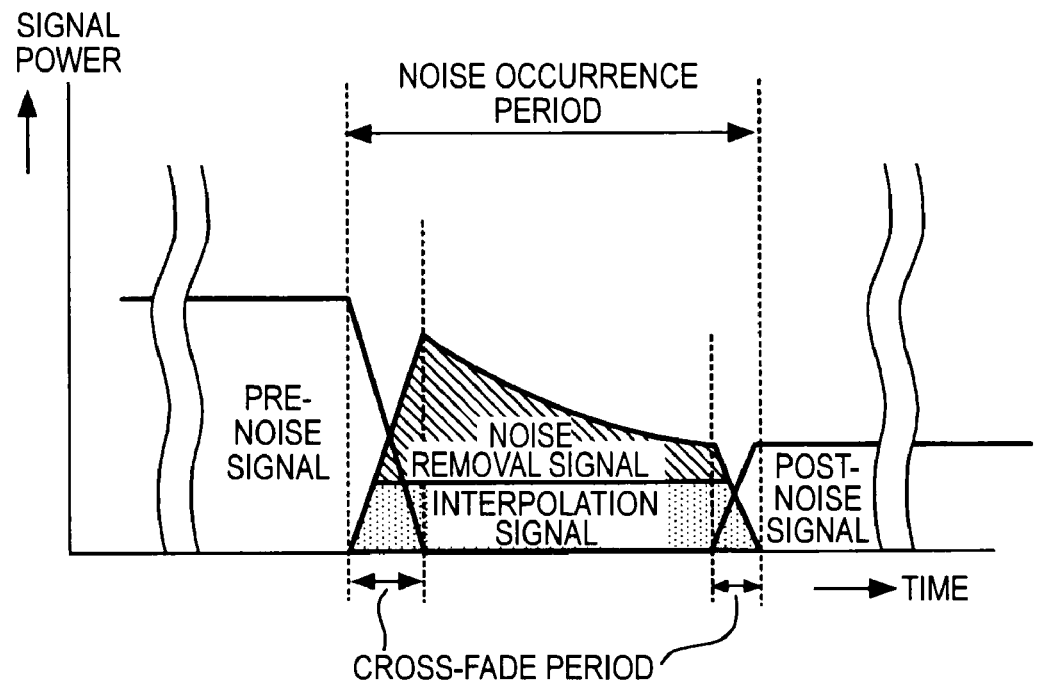

NOISE REDUCING DEVICE AND NOISE DETERMINING METHOD

BACKGROUND OF THE INVENTION

1. Field of the Invention

The present invention relates to a noise reducing device that removes (reduces) noise included in, for example, a sound signal and a noise determining method for determining a state of occurrence of noise.

2. Description of the Related Art

Microphones are incorporated in electronic apparatuses such as a video camera, a digital still camera, a cellular phone, and an IC recorder. In such electronic apparatuses, noise that temporally intermittently and irregularly occurs such as head seek sound and retract sound of an incorporated disk drive, lens driving sound in a lens mechanism, and click sound and touch sound by user operation or the like could occur. In the electronic apparatuses, the microphones pick up noise.

Therefore, as disclosed in JP-A-2008-52772, JP-A-2008-71374, and JP-A-2008-77707, there is proposed a configuration for detecting noise occurrence timing from a sound signal or a sensor output of an oscillation sensor and executing noise removal (noise reduction) for the sound signal in a period corresponding to the detected noise occurrence timing.

SUMMARY OF THE INVENTION

When noise as an removal target is noise that temporally intermittently and irregularly occurs as explained above, it is advantageous in terms of, for example, effective use of resources and acoustics to accurately recognize a state of occurrence of the noise and execute noise removal processing on the basis of a result of the recognition.

Therefore, it is desirable to make it possible to determine a state of occurrence of noise as an removal target more accurately than in the past in order to perform, for example, noise removal.

According to an embodiment of the present invention, there is provided a noise reducing device including: a sound-signal input unit that inputs a sound signal; a time-to-frequency converting unit that converts the input sound signal obtained by being input by the sound-signal input unit into a frequency signal; a patterning unit that calculates, for each of divided frequencies of the frequency signal, an nth order polynomial (n is a natural number) as a polynomial for interpolating sampling points and acquires a coefficient pattern including a set of values of coefficients of respective orders of the polynomial; a matching-data storing unit that stores, in association with the divided frequencies, matching data indicating a matching range as a range of a coefficient pattern regarded as noise; and a noise determining unit that determines, on the basis of a result obtained by comparing the coefficient pattern acquired by the patterning unit and the matching range indicated by the matching data, at least presence or absence of noise occurrence at a divided frequency corresponding to data of the compared coefficient pattern.

In the configuration explained above, an input sound signal is converted into a frequency signal and then, for each of divided frequencies forming the frequency signal, a polynomial for interpolating sampling points of the divided frequency is calculated. Presence or absence of noise is determined on the basis of comparison of a pattern formed by coefficients of the polynomial (a coefficient pattern) and a matching range corresponding to noise sound indicated as the coefficient pattern.

According to the polynomial calculated as explained above, for example, it is possible to continuously treat an amplitude change in a time axis for each of the divided frequencies that are obtained only discretely. Consequently, higher accuracy can be obtained for a noise recognition result based on the polynomial.

As explained above, according to the embodiments of the present invention, it is possible to obtain, concerning noise recognition processing, a recognition result more highly accurate than that in the past.

BRIEF DESCRIPTION OF THE DRAWINGS

FIG. 9 illustrates diagrams of an example in which a divided frequency signal subjected to peak detection is subjected to quartic polynomialization, time direction normalization, and amplitude direction normalization;

FIG. 10 illustrates diagrams of an example in which a divided frequency signal subjected to peak detection is subjected to quadratic polynomialization, time direction normalization, and amplitude direction normalization;

FIG. 12 is a diagram of an example of content of the matching table according to the embodiment;

FIG. 18 illustrates diagrams of examples of forms of timing for switching a sound signal subjected to noise removal and an input sound signal;

DETAILED DESCRIPTION OF THE INVENTION

Embodiments of the present invention are explained below according to the following order.
<1. Overall Flow of Noise Removal Processing>
<2. Configuration Example (First Example) of a Noise-Recognition Processing Unit>
　2-1. Overall Configuration
　2-2. FFT Processing
　2-3. Peak Detection
　2-4. Polynomial Operation/Normalization Processing
　2-5. Noise Presence or Absence Determination Processing
<3. Configuration Example (Second Example) of the Noise-Recognition Processing Unit>
<4. Configuration Example (First Example) of a Noise Reducing Device>
　4-1. Overall Configuration
　4-2. Noise Occurrence Period Determination Processing
<5. Configuration Example (Second Example) of the Noise Reducing Device>
<6. Configuration Example (Third Example) of the Noise Reducing Device>
　6-1. Overall Configuration Example
　6-2. Interpolation Signal Generation Processing Based on a Pitch (First Example)
　6-3. Interpolation Signal Generation Processing Based on a Pitch (Second Example)
　6-4. Interpolation Signal Generation Processing Based on a Pitch (Third Example)
<7. Configuration Example (Fourth Example) of the Noise Reducing Device>

In the following explanation, the words "removal" and "reduction" concerning noise are used. However, in this application, the words "removal" and "reduction" concerning noise have equivalent meanings. The removal of noise can be regarded as a word involving operation and processing for removing noise superimposed on a sound signal. As a result of the noise removal, for example, in some case, the noise is not completely removed in a strict sense and components of the noise remain to some extent. Therefore, the noise reduction can be regarded as a word defined in view of the result of the noise removal processing.

1. Overall Flow of Noise Removal Processing

Figure 1:
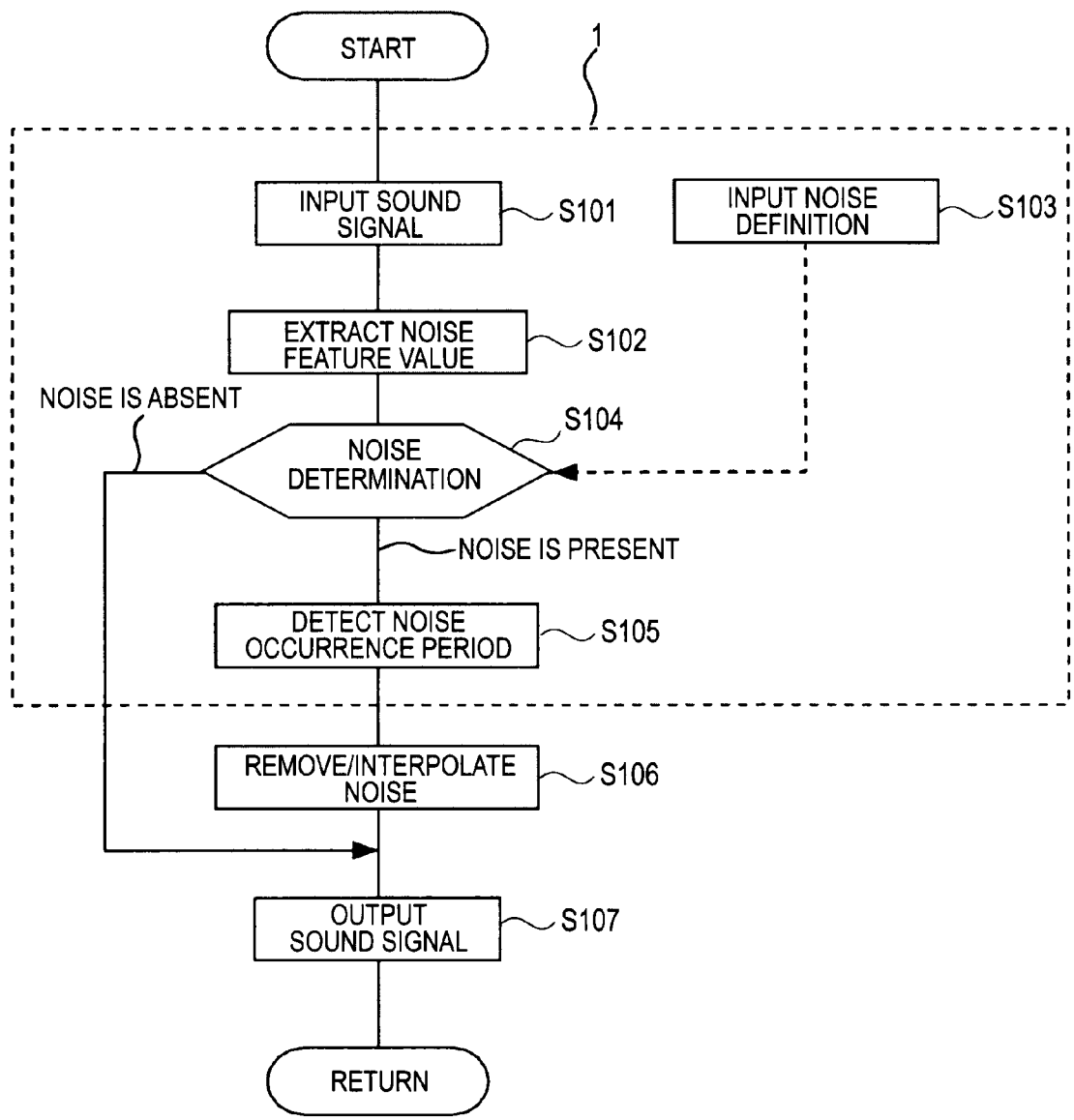
FIG. 1 is a flowchart for explaining a flow of a procedure executed by a noise reducing device according to an embodiment of the present invention.

FIG. 1 is a flowchart for explaining an overall procedure example of processing for noise reduction that can be applied to a noise reducing device according to an embodiment of the present invention.

As a premise, the noise reducing device according to this embodiment removes, as noise superimposed on sound, noise that temporally intermittently and irregularly occurs. For example, when an electronic apparatus is a recording and reproducing apparatus or the like incorporating a disk drive device, head seek sound, retract sound, or the like of the incorporated disk drive device could be a source of occurrence of such noise that temporally intermittently and irregularly occurs. When an electronic apparatus includes an imaging unit such as a video camera device or a digital still camera, for example, lens driving sound in a lens mechanism or click sound or touch sound by user operation or the like could be a source of occurrence of the noise.

In FIG. 1, first, in step S101, a sound signal in which noise as a removal target is likely to be combined is input. A sound signal source input in step S101 is, for example, sound obtained by being collected by a microphone as explained later.

In step S102, a feature value (a noise feature value) concerning a sound component equivalent to noise is extracted from the sound signal input in step S101. A specific feature value is extracted from the sound signal on the basis of a noise definition corresponding to step S104.

In step S103, information concerning the noise feature value extracted in step S102 and information concerning the noise definition input in step S104 are compared. The information concerning the noise definition includes data of a noise feature value obtained from, for example, sound of noise caused by a noise occurrence source assumed in advance.

As a result of the comparison in step S104, when it is determined that there is an approximation ratio equal to or larger than a fixed ratio between the information concerning the noise definition and the information concerning the noise feature value, it is determined that noise is present. On the other hand, when it is determined that the approximation ratio is smaller than the fixed ratio, it is determined that noise is absent.

When a determination result indicating absence of noise is obtained in step S104, noise removal processing is not performed and the sound signal input in step S107 is output.

On the other hand, when a determination result indicating presence of noise is obtained, processing in steps S105 and S106 is executed.

In step S105, a noise occurrence period is detected. Specifically, in step S105, an occurrence period (occurrence timing) of noise detected in step S104 is detected.

In step S106, processing for removing the noise from the sound signal input in step S101 is executed according to the noise occurrence period detected in step S105.

A sound component as the noise is removed by the noise reduction processing. As a result, in a noise reduction target section of the original input sound signal, a lack of sound information corresponding to the removed noise sound occurs. Therefore, in this case, processing for interpolating a sound signal component is executed to supplement the lack of the sound information. In step S107, a sound signal subjected to the noise removal and the interpolation is output.

2. Configuration Example (First Example) of a Noise-Recognition Processing Unit

2-1. Overall Configuration

The processing in steps S101 to S105 shown in FIG. 1 can be regarded as generalization of processing that should be executed by a noise-recognition processing unit 1 in the noise reducing device according to this embodiment.

Figure 2:
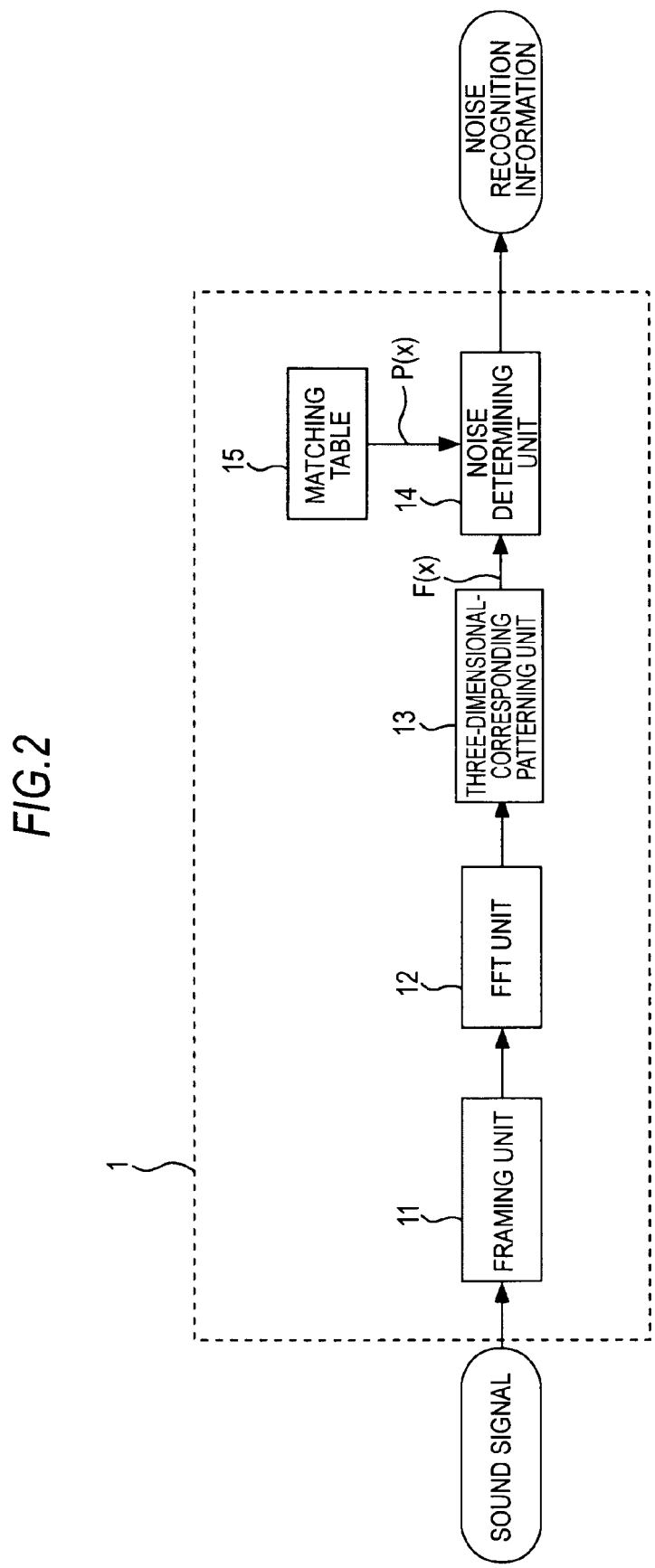
FIG. 2 is a block diagram of a configuration example of a noise-recognition processing unit (a first example) according to the embodiment.

FIG. 2 is a diagram of the processing corresponding to steps S101 to S105 shown in FIG. 1, i.e., an overall configuration example as a first example of the noise-recognition processing unit 1 in a form further embodied according to this embodiment.

The noise-reduction processing unit 1 shown in FIG. 2 includes a framing unit 11, an FFT unit 12, a three-dimensional patterning unit 13, a noise determining unit 14, and a matching table 15.

The framing unit 11 inputs a sound signal according to step S101 shown in FIG. 1. Processing by the framing unit 11, the FFT unit 12, and the three-dimensional patterning unit 13 corresponds to the processing of the noise feature value extraction in step S102.

2-2. FFT Processing

In this embodiment, an input sound signal on a time axis is converted into a signal in a frequency domain (a frequency signal) by, for example, FFT (Fast Fourier Transform).

The framing unit 11 applies, as pre-processing of the FFT, processing in frame units as processing units of the FFT to the input sound signal.

The input sound signal input by the framing unit 11 is real number data in a time domain (a time domain data) including a predetermined sampling frequency fs and the number of quantized bits. As a specific example, assuming that the sampling frequency fs of the input sound signal is 44.1 kHz, the framing unit 11 forms one frame with 1024 data corresponding to predetermined time width as shown in (a) of FIG. 3.

Figure 3:
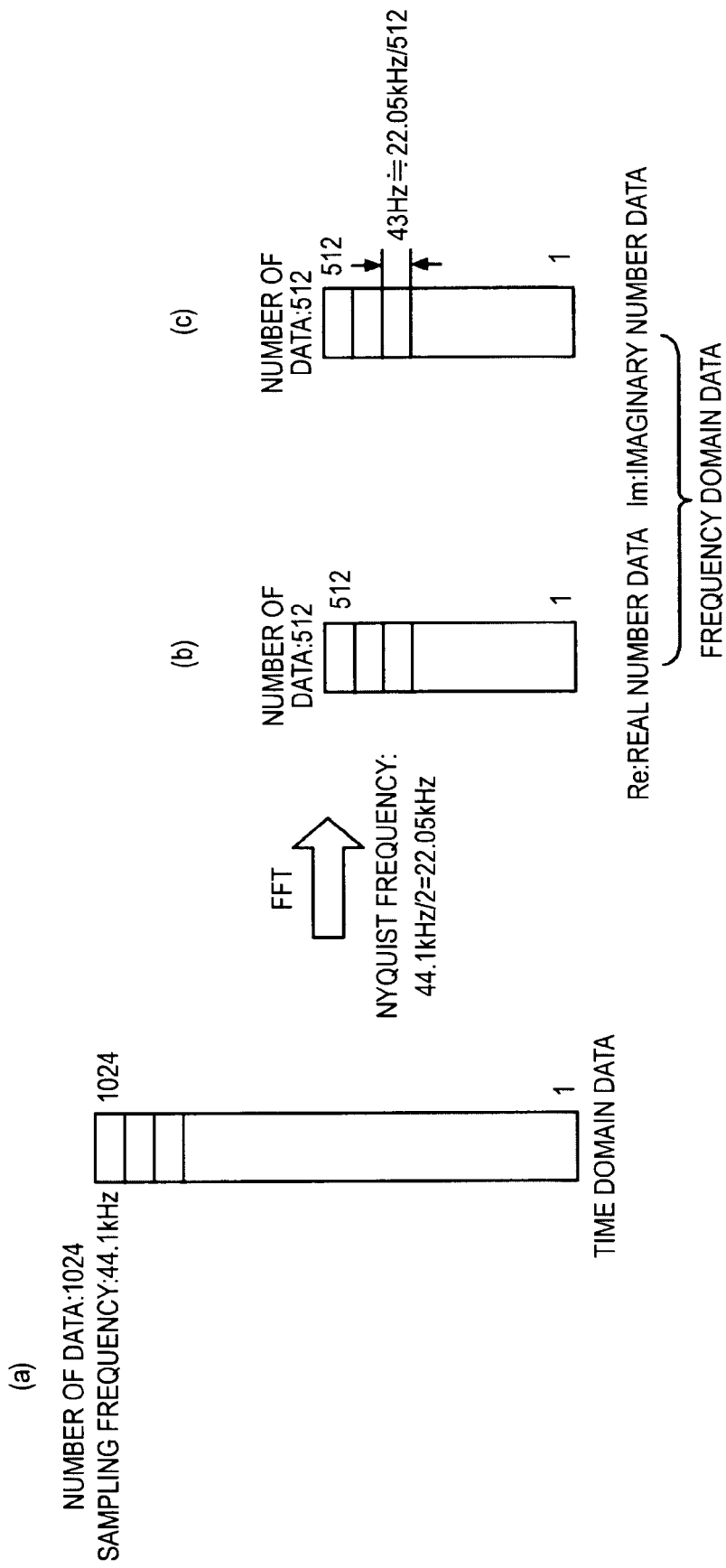
FIG. 3 illustrates schematic diagrams of an example of FFT processing executed by an FFT unit according to the embodiment.

The FFT unit 12 executes the FFT processing for each of the data of the one frame to convert the data into frequency domain data (a frequency signal) including real number data Re and imaginary number data Im as shown in (b) and (c) of FIG. 3. Since the frequency domain data is converted into complex number data, as it is well known, it is possible to represent a wave including a phase in the frequency domain.

When the number of data of one frame is 1024 and the sampling frequency fs is 44.1 kHz as shown in (a) of FIG. 3, the real number data Re and the imaginary number data Im are respectively a Nyquist frequency of 22.05 kHz (44.1 kHz/2) and 512 data as shown in (b) and (c) of FIG. 3. In this case, frequency resolution for the real number data Re and the imaginary number data Im is about 43 Hz (22.05 kHz/512: Nyquist frequency/the number of data). In other words, according to the FFT processing in this case, a frequency signal is obtained by data for each of frequencies obtained by dividing a frequency band range of 0 to 22.05 kHz into 512 frequency band ranges for each 43 Hz (hereinafter referred to as divided frequencies).

The data of the frequency signal output by the FFT unit 12 can be calculated as, for example, the following absolute amplitude Va.

$$\text{Absolute amplitude } Va = \sqrt{(Re)^2 + (Im)^2} \quad (1)$$

In correspondence to FIG. 3, for example, the absolute amplitude Va in Formula (1) is calculated by using data Re of the same divided frequency among the 512 data forming each of the real number data Re and the imaginary number data Im. 512 absolute amplitudes Va are obtained to correspond to each of the divided frequencies.

In this embodiment, the three-dimensional patterning unit 13 at the post-stage of the FFT unit 12 receives the input of the absolute amplitude Va and executes processing.

Figure 4:
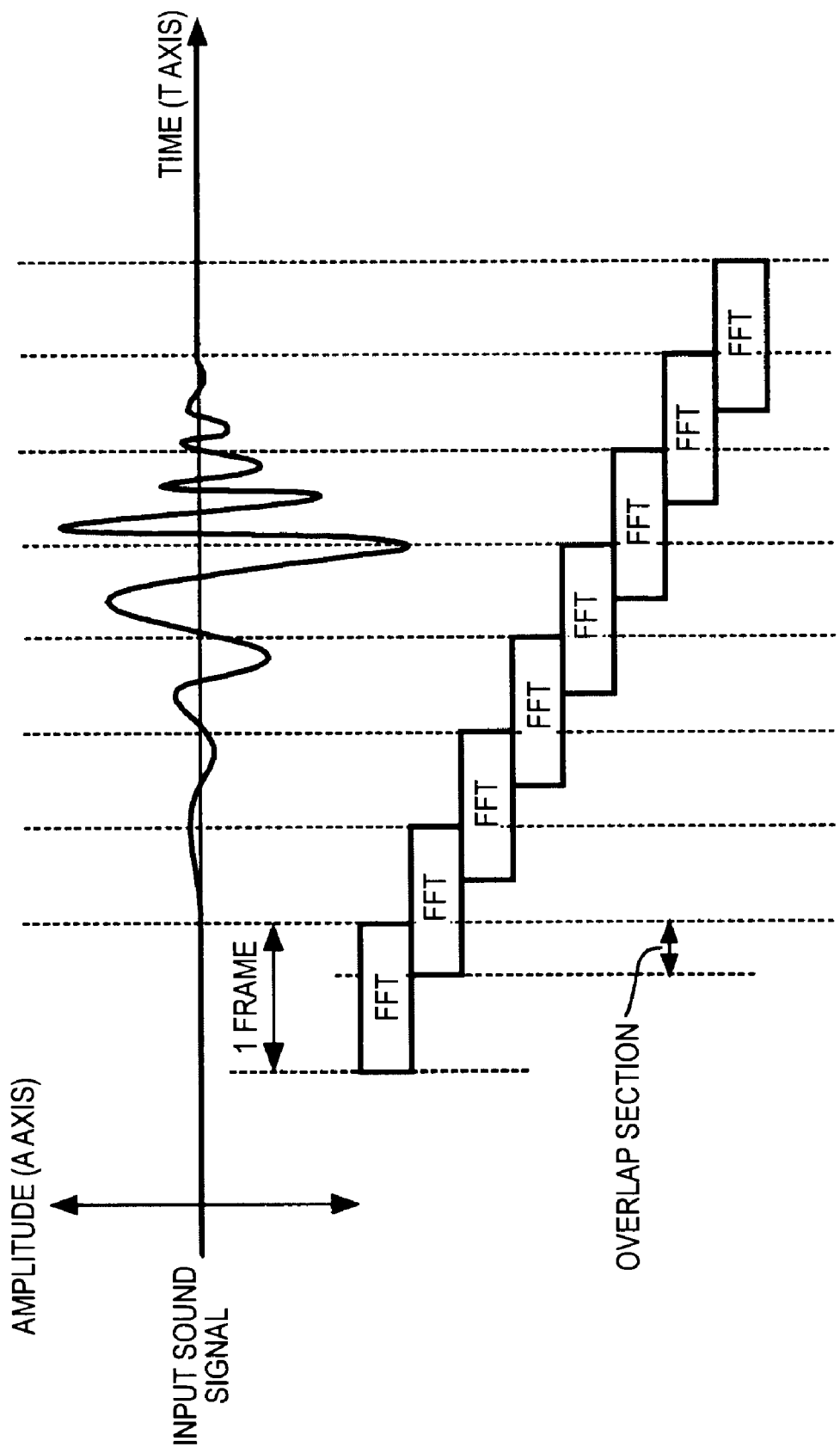
FIG. 4 is a schematic diagram of an example of FFT processing in frame units executed by the FFT unit according to the embodiment.

As shown in FIG. 4, the framing unit 11 according to this embodiment executes framing of the input sound signal such that an overlap section is obtained concerning frames continuous along time (a T axis) of the input sound signal. The FFT unit 12 performs the FFT for each of frames obtained in this way and converts the input sound signal into a frequency signal.

A reason for providing the overlap section between the continuous frames is as explained below.

The FFT processing is performed using plural data in a frame. Therefore, in the FFT processing near start and end positions of the frame, originally, data before a start position or data after an end position of one frame has to be used. However, since the data may be unable to be used, it is difficult to obtain an accurate value as data after the FFT processing.

Therefore, if the overlap section is provided, the FFT processing near the start and end positions in one frame is properly executed by using all necessary data in other frames that overlap the one frame. Consequently, it is possible to improve time resolution for the FFT processing and obtain a more accurate arithmetic operation result of the FFT processing.

An overlap ratio concerning the overlap section, i.e., a ratio of time for overlapping the continuous frames to time for one frame should be set as appropriate between 0% to 100% with a balance between the frequency resolution and the time resolution of the FFT processing taken into account.

2-3. Peak Detection

The frequency signal obtained by the FFT unit 12 is output to the three-dimensional patterning unit 13 shown in FIG. 2.

As explained below, the three-dimensional patterning unit 13 performs, on the basis of the frequency signal obtained by the FFT unit 12, polynomialization for each of noise components of the sound signal and obtains a coefficient pattern of the polynomial. In other words, the three-dimensional patterning unit 13 performs pattern recognition (patterning) for the noise. The noise pattern recognition is equivalent to the extraction of the noise feature value in step S102.

Figure 5:
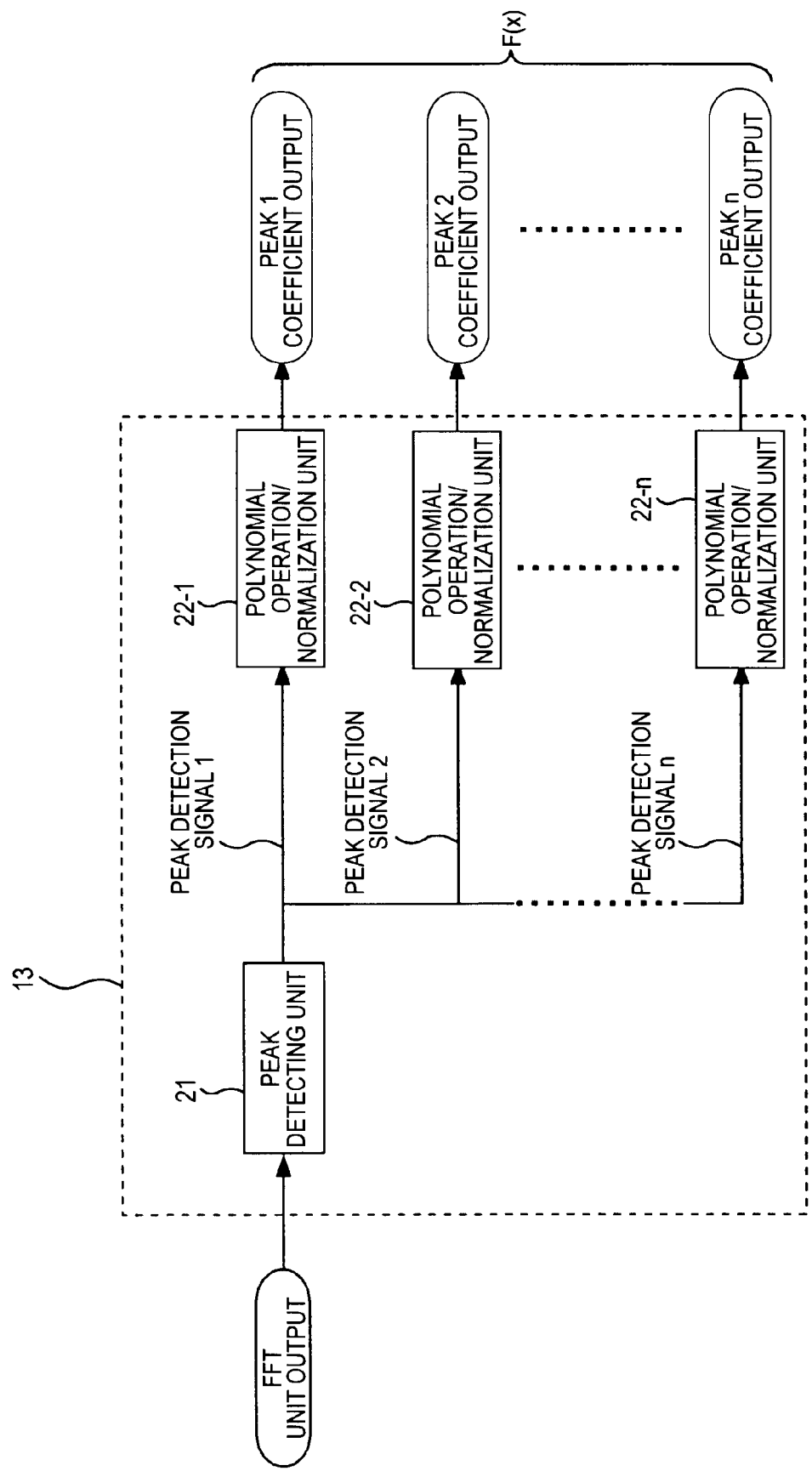
FIG. 5 is a diagram of a configuration example of a three-dimensional patterning unit according to the embodiment.

A configuration example of the three-dimensional patterning unit 13 is shown in FIG. 5.

The three-dimensional patterning unit 13 shown in the figure includes a peak detecting unit 21 and n polynomial operation/normalization units 22-1 to 22-n.

The frequency signal output from the FFT unit 12 is input to the peak detecting unit 21.

As explained above, the frequency signal output from the FFT unit 12 includes the real number data Re and the imaginary number data Im shown in (b) and (c) of FIG. 3. For example, the frequency signal is obtained as 512 absolute amplitudes Va(1) to Va(512) calculated by the arithmetic operation of Formula (1) for each of data of the real number data Re and the imaginary number data Im, i.e., in the example shown in FIG. 3, for each of bands (divided frequencies) 1 to 512 having frequency resolution of about 43 Hz.

Figure 6:
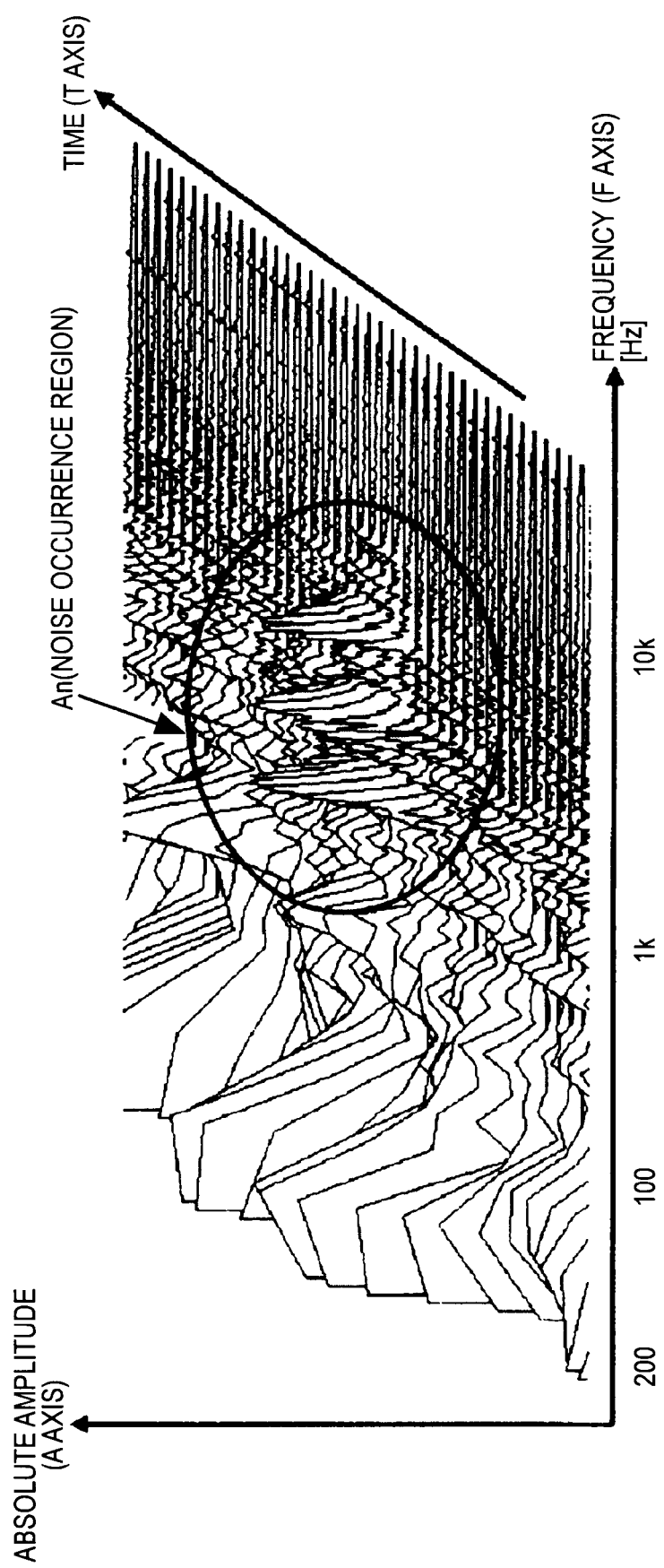
FIG. 6 is a diagram of an example of a processing result by the FFT unit according to the embodiment represented as a three-dimensional waveform.

An example of a result of the processing by the FFT unit 12 can be represented as a three-dimensional waveform shown in FIG. 6. The three-dimensional waveform can be formed by collecting, according to time series, the 512 absolute amplitudes Va(1) to Va(512) obtained for each of frames as the frequency signal obtained by the FFT unit 12.

In the three-dimensional waveform, a frequency axis (F axis) and a time axis (T axis) are set to be orthogonal to each other in a plane direction. An absolute amplitude value is set as an A axis in the vertical direction. In a state shown in the figure, three peaks are obtained in different frequency bands at substantially the same time in an area portion An surrounded by a solid line in the three-dimensional waveform chart. Portions of the waveform projecting higher than the periphery to correspond to the peaks actually mean that noise occurs. In other words, the area portion An indicates a time-frequency area (a noise occurrence area) in which noise is assumed to occur.

The peak detecting unit 21 shown in FIG. 5 detects peaks on, for example, the three-dimensional waveform shown in the noise occurrence area (An) shown in FIG. 6.

Figure 7:
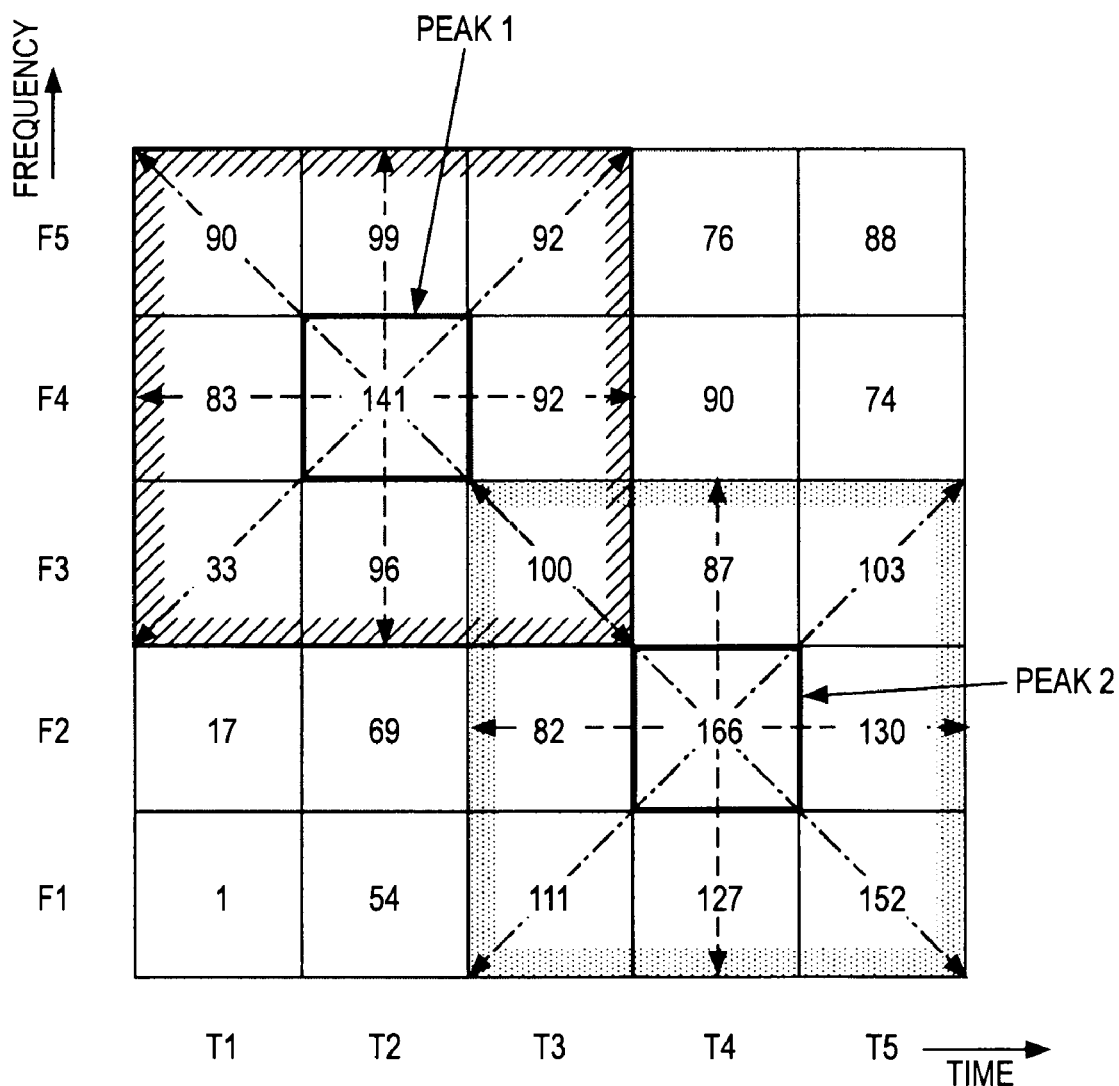
FIG. 7 is a schematic diagram of peak detection processing executed by a peak detecting unit according to the embodiment.

Therefore, the peak detecting unit 21 performs data mapping using data of the input frequency signal (absolute amplitude data for each of the divided frequencies) to obtain map data shown in FIG. 7. The map data represents the three-dimensional waveform illustrated in FIG. 6.

In the map data shown in FIG. 7, time is plotted on the abscissa and a frequency is plotted on the ordinate. As a part of the map data, a portion of a matrix of times T1, T2, T3, T4, T5, and the like and frequencies F1, F2, F3, F4, F5, and the like is shown. Each of the frequencies F1, F2, F3, F4, F5, and the like is equivalent to each of divided frequencies corresponding to each of the 512 data forming the real number data Re and the imaginary number data Im. Each of the times T1, T2, T3, T4, T5, and the like is equivalent to time when one frame is obtained.

In correspondence to FIG. 7, first, the peak detecting unit 21 maps absolute amplitudes 1, 17, 33, 83, 90, and the like respectively corresponding to the frequencies (the divided frequencies) F1, F2, F3, F4, F5, and the like from a frequency signal obtained at the time T1 to correspond to one frame. Thereafter, the peak detecting unit 21 sequentially maps absolute amplitudes respectively corresponding to the frequencies F1, F2, F3, F4, F5, and the like from frequency signals in frame units input as frequency signals corresponding to the times T2, T3, T4, T5, and the like.

When the map data is created as explained above, the peak detecting unit 21 detects peaks of one or more absolute amplitudes Va from an amplitude value distribution on the map data. As an example of a method and an algorithm for peak detection using the map data, first, a set of squares (sampling points) of a 3×3 matrix is set as a peak detection range.

In the peak detection range, search for peaks is performed in the same time direction and the same frequency direction as indicated by a broken arrow. When a peak is obtained at the same sampling point in the time direction and the frequency direction as a result of the search, a time-frequency coordinate corresponding to the sampling point is set as a first interim peak point.

Further, in the same peak detection range, search for peaks is performed in two directions orthogonal to the time direction and the frequency direction to extend over frequencies and times. When a peak is obtained at the same sampling point in the time direction and the frequency direction, a time-frequency coordinate corresponding to the sampling point is set as a second interim peak point.

When the first interim peak point and the second interim peak point are the same sampling point, a time-frequency coordinate of the sampling point is detected as a true peak point.

In an example shown in FIG. 7, peaks detected on the map data by the peak detection algorithm are a coordinate (T2, F4) corresponding to a sampling point at absolute amplitude 141 and a coordinate (T4, F2) corresponding to a sampling point at absolute amplitude 166.

In this way, in this embodiment, when peaks in the divided frequency signals are detected, not only a change in time series in the divided frequencies corresponding thereto but also an amplitude change in the frequency direction is taken into account. In other words, peaks are detected on the basis of a two-dimensional distribution of absolute amplitudes on the frequency axis and the time axis. This makes it possible to more accurately detect peaks.

The method of peak detection explained above is only an example. Actually, the number of sampling points forming the peak detection range may be increased. As the axis to be searched for peak detection, at least one may be selected out of the four directions explained in the example of the method.

2-4. Polynomial Operation/Normalization Processing

Figure 8:
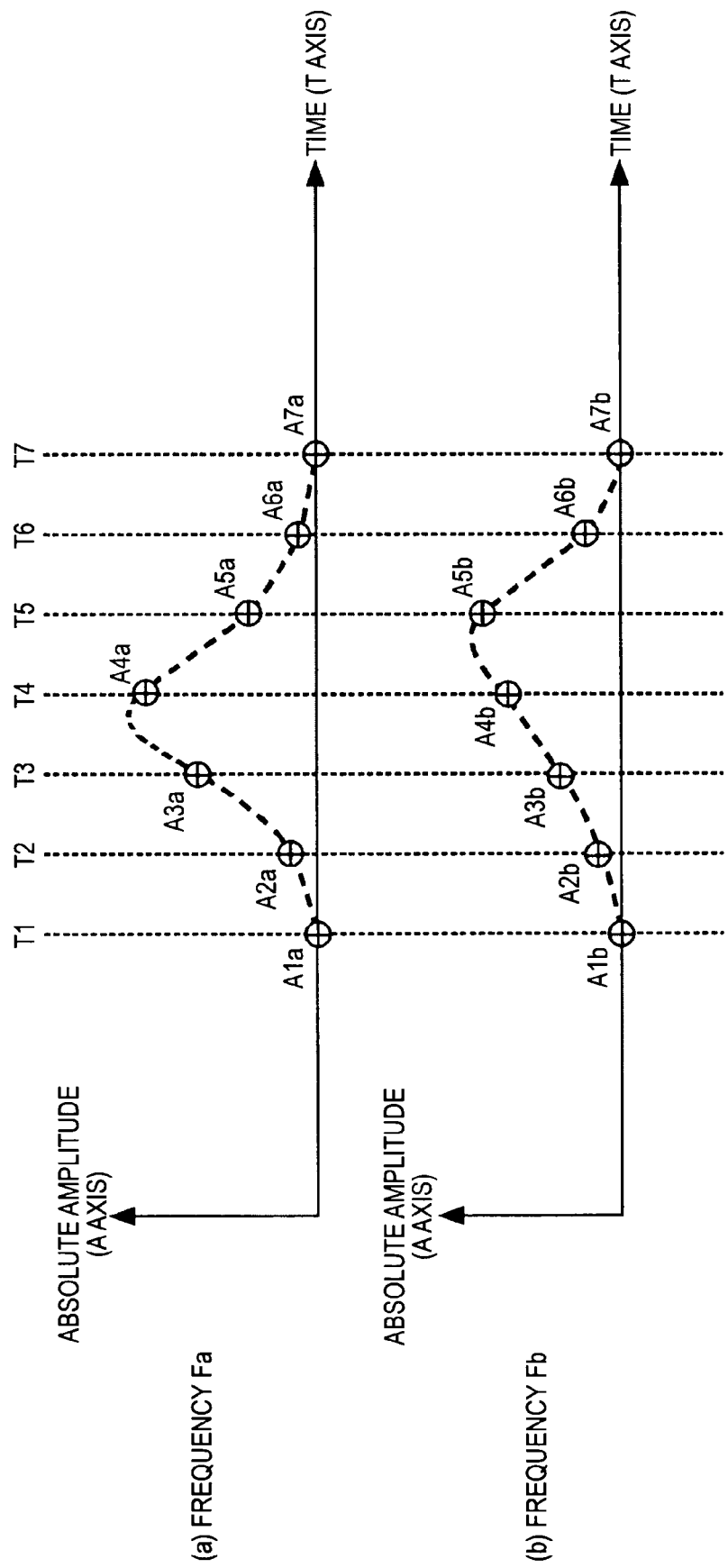
FIG. 8 illustrates diagrams of examples of a divided frequency signal represented by time series of sampling points.

In (a) and (b) of FIG. 8, band signals in time series (divided frequency signals) obtained on the basis of the frequency signal output from the FFT unit 12 are shown as changes in absolute amplitude corresponding to the elapse of time in specific frequencies Fa and Fb. Time is plotted on the abscissa (a T axis) and absolute amplitude is plotted on the ordinate (an A axis).

A sound signal treated in this embodiment is digital data. Therefore, the sound signal is sampled temporally discretely. As an example, in the band signal at the frequency Fa shown in (a) of FIG. 8, values of absolute amplitudes of sampling points at times T1, T2, T3, T4, T5, T6, and T7 are respectively represented as A1a, A2a, A3a, A4a, A5a, A6a, and A7a. In the band signal at the frequency Fb shown in (b) of FIG. 8, values of absolute amplitudes of sampling points at time T1, T2, T3, T4, T5, T6, and T7 are respectively represented as A1b, A2b, A3b, A4b, A5b, A6b, and A7b.

When the absolute amplitudes are discretely sampled as explained above, this means that a peak in the sampled absolute amplitudes does not always indicate a true peak of a band signal.

For example, a peak of the absolute amplitudes of the respective sampling points shown in (a) of FIG. 8 is A4a at time T4. However, a true peak estimated by imaginarily connecting the absolute value amplitudes A1a to A7a at the times T1 to T7 with a curve (indicated by a broken line in the figure) appears at timing before the time T4.

Similarly, a peak of the sampled absolute amplitudes shown in (b) of FIG. 8 is A5b at the time T5. However, a true peak estimated by imaginarily connecting the absolute amplitudes A1b to A7b at the times T1 to T7 with a curve (indicated by a broken line in the figure) appears at timing before the time T5.

When it is desired to calculate a value approximate to a true peak value as much as possible from the sampled absolute amplitudes, for example, time resolution only has to be improved. In other words, the sampling frequency only has to be increased. However, since the time resolution and the frequency resolution are in a tradeoff relation, it is undesirable to improve the time resolution thoughtlessly. To improve the time resolution while making up for this point, for example, the overlap section is provided in the FFT processing in frame units as shown in FIG. 4. However, when the overlap ratio is increased, a processing amount increases to be extremely large. Therefore, practically, the sampling points have to be dispersed at proper time intervals.

At it is also seen from envelopes of the sampling points respectively indicated by the broken lines in (a) and (b) of FIG. 8, a waveform of a band signal obtained according to the detected peak could be different every time the peak is detected. This means that a waveform obtained according to the peak detected by the peak detecting unit 21 is likely to have a waveform pattern of noise or likely to have a waveform pattern of necessary sound other than noise.

Therefore, when a peak of the sampling points is detected by the peak detecting unit 21, it is necessary to compare a band signal corresponding to the peak with a pattern of noise prepared in advance after obtaining information concerning a pattern corresponding to a waveform in which a true peak position is estimated at high accuracy.

The polynomial operation/normalization units 22-1 to 22-n in the three-dimensional patterning unit 13 execute processing explained below in order to obtain a pattern corresponding to the detected peak.

In the three-dimensional patterning unit 13, the peak detecting unit 21 outputs peak detection signals 1 to n respectively for detected peaks 1 to n.

In correspondence to FIG. 7, first, the peak detecting unit 21 detects the peak 1 of the frequency F4 at the time T2 and outputs the peak detection signal 1 corresponding to the peak 1. Subsequently, at the time T4, the peak detecting unit 21 detects the peak 2 of the frequency F2 and outputs the peak detection signal 2 corresponding to the peak 2.

As peak detection signals, with an absolute amplitude point of a sample position detected as a peak set as a reference sampling point, first, the peak detecting unit 21 outputs absolute amplitude of the reference sampling point, absolute amplitudes of N sampling points immediately preceding the reference sampling point on the time axis among sampling points having a frequency same as that of the reference sampling point, and absolute amplitudes of N sampling points immediately following the reference sampling point on the time axis among the sampling points.

The number N of sampling points before and after the reference sampling point is determined according to setting of the order of a polynomial calculated by the arithmetic operation of the polynomial operation/normalization unit 22 (22-1 to 22-n) as explained below.

First, the polynomial operation/normalization unit 22 calculates a polynomial of a curve passing the reference sampling point (having a value of the absolute amplitude) corresponding to one specific frequency input as the peak detection signal as explained above and the N sampling points temporally preceding and following the reference sampling point (the reference sampling point and the N sampling points before and after the reference sampling point are hereinafter referred to as sampling points for arithmetic operation) or a curve approximate to the sampling point. The sampling point is represented with sampling time and absolute amplitude corresponding thereto set as an x coordinate and a y coordinate, respectively.

The polynomial calculated in this way represents a waveform of a band signal in which a peak is detected.

As a method of calculating a polynomial of a curve by interpolating plural sampling points, i.e., coordinates, various methods such as the Lagrange's interpolation method, the spline interpolation method, and the least square approximation method are known. In this embodiment, any one of these methods may be adopted. However, in the following explanation, as an example, the Lagrange's interpolation method is adopted.

The Lagrange's interpolation method is briefly explained.

It is assumed that there are data y0, y1, y2, . . . , and yn at n+1 discrete sampling points x0, x1, x2, . . . , and xn (x0<x1<x2< . . . xn). A function F(x) as a Lagrange's interpolation curve passing these points (x0, y0), (x1, y1), (x2, y2), . . . , and (xn, yn) is an nth order polynomial and can be calculated from the following Formula (2).

$$F(x) = y0 \cdot g0(x)/g0(x0) + y1 \cdot g1(x)/g1(x1) + \\ y2 \cdot g2(x)/g2(x2) + \ldots + \\ yn \cdot gn(x)/gn(xn) \\ = \sum_{i=0}^{n} \{yi(n) \cdot gi(x)/gi(xi)\} \quad (2)$$

$$gi(x) = L(x)/(x - xi), (i = 0, 1, 2, \ldots, n)$$
$$L(x) = (x - x0)(x - x1)(x - x2) \ldots (x - xn)$$

An example in which a band signal in which a peak is detected is represented by a quartic polynomial on the basis of a peak detection signal of the peak is shown in (a) of FIG. 9.

In the case of the quartic polynomial, five (=n+1) sampling points are necessary. Therefore, as the peak detection signal in this case, a reference sampling point and two sampling points temporally preceding and two sampling points temporally following the reference sampling point, which have a frequency same as that of the reference sampling point, are output to the polynomial operation/normalization unit 22.

In (a) of FIG. 9, five coordinates (0.0, 7.0), (−1.0, 6.0), (−2.0, 1.0), (1.0, 3.0), and (2.0, 1.0) are shown as the five sampling points.

Among these coordinates, the coordinate (0.0, 7.0) is the reference sampling point, the coordinates (−1.0, 6.0) and (−2.0, 1.0) are the two sampling points immediately preceding the reference sampling point, and the coordinates (1.0, 3.0) and (2.0, 1.0) are the two sampling points immediately following the reference sampling point.

The polynomial operation/normalization unit 22 calculates a quartic polynomial passing these sampling points. As shown in the figure, the quartic polynomial is represented by the following Formula (3).

$$F(x) = 0.3x^4 + 0.5x^3 - 2.8x^2 - 2.0x + 7.0 \quad (3)$$

A curve shown in (a) of FIG. 9 is represented by Formula (3).

As it is seen from the curve shown in (a) of FIG. 9, a maximum (an extreme value) of the quartic polynomial represented by Formula (3) is different from a y coordinate value of the reference sampling point. In this embodiment, a waveform close to a true waveform can be calculated for a band signal (a divided frequency signal) by polynomializing the band signal. Consequently, for example, a peak level and peak time of the band signal can also be more accurately calculated.

Processing for polynomializing the band signal can be regarded as processing for further adding a time axis (the x axis in FIGS. 9 and 10) to a frequency signal having two-dimensional representation by a frequency axis and an amplitude axis to three-dimensionally represent the frequency signal.

Subsequently, the polynomial operation/normalization unit 22 normalizes the quartic polynomial calculated as Formula (3). As it is understood from the following explanation, the normalization is processing for approximating a coefficient of an odd number order term to 0 or a value of a degree that may be regarded as 0. The processing can simplify processing for comparison with the matching table 15 for noise determination.

As the normalization, first, the polynomial operation/normalization unit 22 applies quartic polynomial conversion to the x coordinate of the maximum of the quartic polynomial calculated first such that the x coordinate is set to 0. In other words, the polynomial operation/normalization unit 22 executes normalization of the x coordinate, i.e., in a time direction.

A quartic polynomial representing a curve shown in (b) of FIG. 9, i.e., a quartic polynomial obtained by normalization in the time direction is represented by the following Formula (4).

$$F(x)=0.3x^4+0.1x^3-3.1x^2+7.3 \quad (4)$$

As it is seen when Formula (4) and Formula (3) are compared, a coefficient of an odd number order term by $x^3$ is converted into 0.1, i.e., a value that may be regarded as 0. A coefficient of an odd number order term by x is 0.

The normalization in the time direction is performed on the basis of the fact that "noise that temporally intermittently and irregularly occurs" has, as a characteristic, relatively steep rise and fall within a fixed time. In other words, noise having such a characteristic has strong symmetry with reference to a peak point. Therefore, it is highly likely that the waveform is a curve of an even function. Therefore, if the normalization in the time axis direction is performed as shown in (b) of FIG. 9, the coefficient of the odd number order term is 0 or equivalent to 0. Consequently, fluctuation concerning a coefficient pattern explained later can be suppressed. As explained later, it is possible to limit a coefficient pattern in a matching range that should be prepared in the matching table 15 and reduce a capacity of the matching table 15.

The polynomial operation/normalization unit 22 according to this embodiment further executes normalization in the amplitude direction as indicated as transition from (b) and (c) of FIG. 9. In other words, a coordinate of a maximum shown in (b) of FIG. 9 is (0.0, 7.3). This y coordinate value 7.3 represents a section. However, a value of the section is not an integer value at this stage. Therefore, the polynomial operation/normalization unit 22 performs normalization such that the section has an integer value. For example, it is assumed that the polynomial operation/normalization unit 22 performs normalization such that the section has an integer value closest to a value of a section coordinate before the normalization.

Consequently, a quartic polynomial is represented by the following Formula (5). In a curve of the quartic polynomial, as shown in (c) of FIG. 9, a coordinate of a maximum is (0.0, 7.0).

$$F(x)=0.3x^4+0.1x^3-3.1x^2+7.0 \quad (5)$$

If the section is changed to an integer, only an integer value has to be prepared for a value of the section in the coefficient pattern. The simplification of the coordinate pattern is further facilitated.

Quadratic polynomialization of a band signal in which a peak same as that in the FIG. 9 is detected is explained with reference to FIG. 10.

In the case of a quadratic polynomial (n=2), the polynomial operation/normalization unit 22 captures, as a peak detection signal, three (n+1) sampling points in total, i.e., a reference sampling point, one sampling point temporally preceding the reference sampling point, and one sampling point temporally following the reference sampling point. Then, in the case of a band signal same as that shown in FIG. 9, as shown in (a) of FIG. 10, three sampling points (0.0, 7.0), (−1.0, 6.0), and (1.0, 3.0) are obtained as a peak detection signal.

A quadratic polynomial calculated by the Lagrange's interpolation method using these sampling points is represented by the following Formula (6). A curve of the quadratic polynomial is a curve shown in (a) of FIG. 10.

$$F(x)=-2.5x^2-1.5x+7.0 \quad (6)$$

A quadratic polynomial obtained by applying normalization in the time axis direction to Formula (6) is represented by the following Formula (7). A curve of the quadratic polynomial obtained by the normalization in the time axis direction is shown in (b) of FIG. 10.

$$F(x)=-2.5x^2+7.2 \quad (7)$$

As it is seen from Formula (7), a coordinate of x as an odd number order term is set to 0 according to the normalization in the time axis direction.

A quadratic polynomial obtained by applying normalization in the amplitude direction, i.e., a change of a value of a section to an integer value is represented by the following Formula (8). A curve of the quadratic polynomial is shown in (c) of FIG. 10.

$$F(x)=-2.5x^2+7.0 \quad (8)$$

As a polynomial adopted by the polynomial operation/normalization unit 22, the quartic polynomial or the quadratic polynomial is explained as an example. However, in this embodiment, a polynomial other than the quadratic polynomial and the quartic polynomial such as a sextic polynomial may be adopted.

In the above explanation, as the normalization processing, first, the normalization in the time direction is performed and then the normalization in the amplitude direction is performed. In practice, for example, the time direction and the amplitude direction only have to finally converge to be properly normalized. In a process until the convergence is completed, an algorithm for executing the normalization in the time direction and the normalization in the amplitude direction while adjusting the same each other may be adopted.

When the polynomialization and the normalization of the band signal in which the peak is detected are completed, the polynomial operation/normalization unit 22 outputs data indicating a coefficient of the normalized polynomial.

In other words, if the polynomial is the quartic polynomial, a general formula thereof can be represented as follows:

$$F(x)=ax^4+bx^3+cx^2+dx+e$$

Therefore, the polynomial operation/normalization unit 22 outputs data indicating a combination of the coefficients [a, b, c, d, e] of the normalized quartic polynomial. The section (e) is treated as a coefficient of $x^0$.

If the polynomial is the quadratic polynomial, a general formula thereof can be represented as follows:

$$F(x)=-ax^2+bx+c$$

Therefore, the polynomial operation/normalization unit 22 outputs data indicating a combination of the coefficients [a, b, c] of the normalized quadratic polynomial.

As explained above, each of the polynomial operation/normalization units 22-1 to 22-$n$ outputs data indicating a combination of coefficients (peak 1 coefficient data to peak n coefficient data) concerning a band signal corresponding thereto. The peak 1 coefficient data to the peak n coefficient data are an output of the three-dimensional patterning unit 13. In other words, the peak 1 coefficient data to the peak n coefficient data are data obtained by patterning a band signal in which a peak is detected, i.e., a band signal assumed to be noise. As shown in FIGS. 2 and 5, for convenience of explanation, the patterned data as the peak 1 coefficient data to the peak n coefficient data are described as F(x) based on the fact that the data is a coefficient of the function F(x) calculated by the Lagrange's interpolation method.

2.5. Noise Presence or Absence Determination Processing

The patterned data F(x) output from the three-dimensional patterning unit 13 is input to the noise determining unit 14 as shown in FIG. 2.

The noise determining unit 14 compares the patterned data F(x) and reference pattern data P(x) stored in the matching table 15 and determines, on the basis of a result of the comparison, presence or absence of noise for each of divided frequencies.

The reference pattern data P(x) is explained below.

First, noise sound set as a removal target by the noise reducing device according to this embodiment is assumed. The polynomial operation and the normalization processing are applied to the noise sound (assumed noise sound) to calculate a normalized polynomial. It is assumed that a quadratic polynomial (a normalized quadratic polynomial) is calculated.

Figure 11:
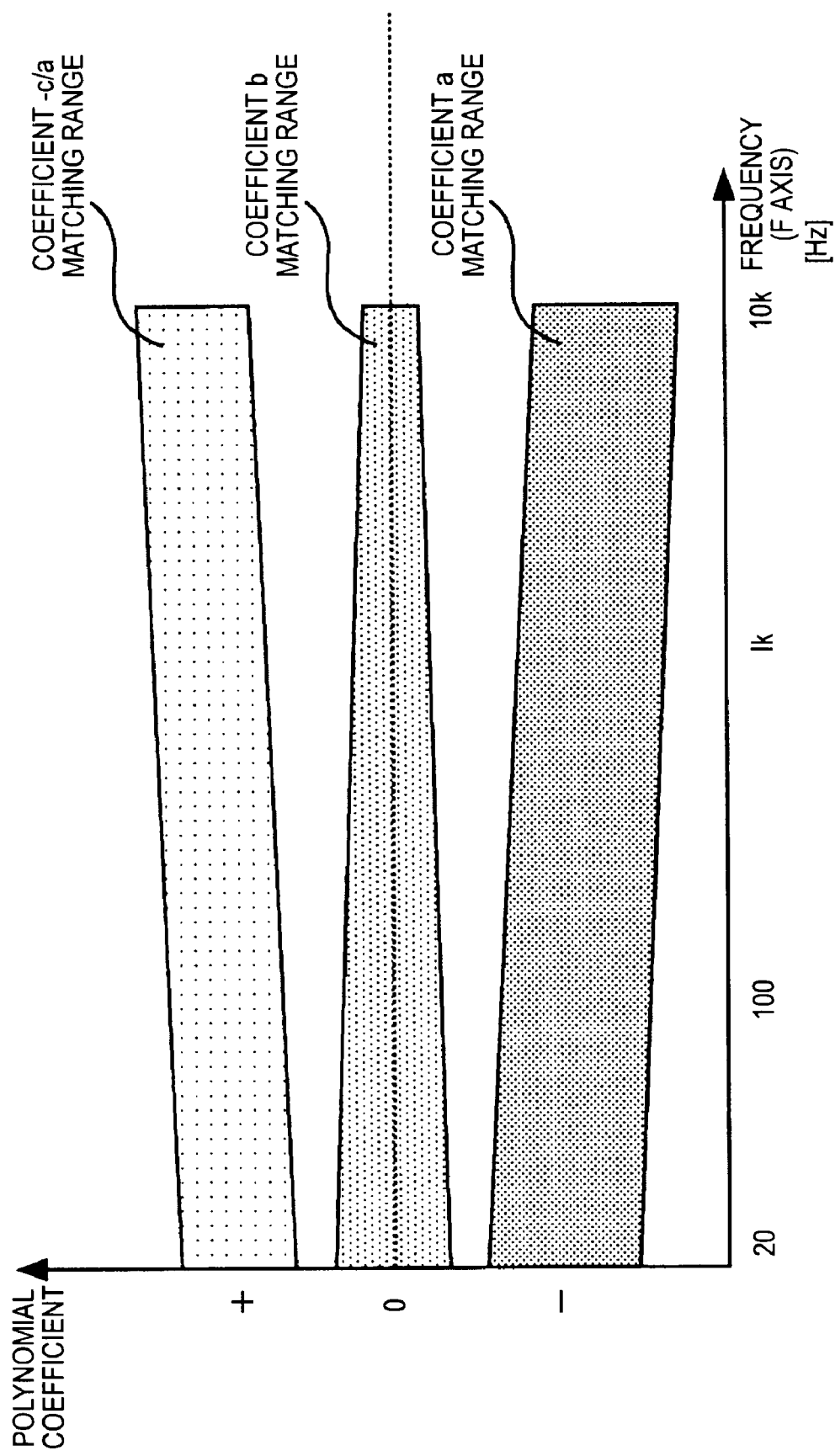
FIG. 11 is a schematic diagram of a matching range of a coefficient pattern indicated by a matching table according to the embodiment.

FIG. 11 is a schematic diagram of a relation between a numerical value range, which coefficients a, b, and c of the normalized quadratic polynomial of the assumed noise sound calculated as explained above could take, and a frequency.

In the figure, a coefficient value of the polynomial is plotted on the ordinate and the frequency is plotted on the abscissa. As shown in the figure, it is seen that the numerical value range of the coefficients, which the normalized quadratic polynomial of the assumed noise sound could take, depends on the frequency.

In this embodiment, a range of coefficient patterns of a normalized polynomial of the assumed noise sound calculated in this way is set as a matching range. In FIG. 11, as the matching range, the coefficient a, the coefficient b, and a coefficient ratio −c/a concerning the coefficients a and c are defined.

For example, the coefficient c may be normally defined as the matching range instead of the coefficient ratio −c/a. However, concerning the normalized polynomial in this embodiment, when the coefficient a is large, the coefficient c (the section) also tends to be large. Therefore, for example, the coefficient ratio −c/a is defined instead of the coefficient c. Consequently, a coefficient change is more leveled than that performed when the coefficient c is simply defined as the matching range. As a result, since fluctuation in the matching range is suppressed, it is possible to narrow the matching range and expect a more accurate noise determination result.

The matching table 15 that stores the reference pattern data P(x) is data (matching data) of a table format indicating the matching range concerning the coefficient pattern by the coefficients a and b and the coefficient ratio −c/a shown in FIG. 11. Therefore, a specific content example of the matching table 15 is shown in FIG. 12. Actually, the data stored in the matching table 15 is stored in a memory or the like.

The matching table 15 shown in FIG. 12 is a matching table formed when the data shown in (b) and (c) of FIG. 3 is obtained as data after the FFT processing. For convenience of explanation, a frequency band (a Nyquist frequency) of a signal after the FFT is set to 22.1 kHz.

First, the matching table 15 shown in the figure is divided for each of predetermined ranges concerning data positions 1 to 512 after the FFT. The matching table 15 is divided in ranges of data positions 1 to 8, data positions 9 to 40, data positions 41 to 53, and data positions 54 to 512. This means that a frequency band 22.1 kHz of data (a frequency signal) after the FFT (a Nyquist frequency of an original signal) is divided by four band ranges (divided band ranges). In other words, 512 divided frequencies corresponding to the data positions 1 to 512 are classified into four groups for each of the divided band ranges.

Ranges of actual frequencies corresponding to the respective divided band ranges are, as shown in the figure, 43.1 kHz to 344.5 Hz for the data positions 1 to 8, 387.6 Hz to 1.72 kHz for the data positions 9 to 40, 1.77 kHz to 2.28 kHz for the data positions 41 to 53, and 2.33 kHz to 22.1 kHz for the data positions 54 to 512.

An upper limit value and a lower limit value are shown for each of the coefficients a and b and the coefficient ratio −c/a in association with the three divided band ranges 43.1 kHz to 344.5 Hz, 387.6 Hz to 1.72 kHz, and 1.77 kHz to 2.28 kHz respectively corresponding to the data positions 1 to 8, the data positions 9 to 40, and the data positions 41 to 53. Concerning the highest divided band range 2.33 kHz to 22.1 kHz corresponding to the data positions 54 to 512, an upper limit value and a lower limit value of an effective matching range are not stored. This is because noise sound assumed in this case does not occur in a frequency band higher than about 2.3 kHz. In other words, the assumed noise sound occurs in a frequency band equal to or lower than about 2.3 kHz (2.28 kHz).

In this case, data that the matching table 15 should actually have only has to be data in a matching range (an upper limit value and a lower limit value) corresponding to the data positions 1 to 8 (the divided band range 43.1 kHz to 344.5 Hz), the data positions 9 to 40 (the divided band range 387.6 Hz to 1.72 kHz), the data positions 41 to 53 (the divided band range 1.77 kHz to 2.28 kHz). In this way, the matching table 15 does not always need to have data in a matching range corresponding to all divided frequencies corresponding to the data after the FFT and only has to have data in a matching range corresponding to only divided frequencies in frequency band ranges in which noise sound occurs. Consequently, it is possible to reduce a data size actually necessary for the matching table 15.

As explained above, the matching table 15 may simply have a matching range of the coefficient c instead of the coefficient ratio −c/a. In FIG. 12, an upper limit and a lower limit of the matching range of the coefficient c are shown in a frame indicated by a broken line.

Noise determination processing by the noise determining unit 14 corresponding to the matching table 15 having the structure shown in FIG. 12 is, for example, as explained below.

First, the noise determining unit 14 receives, from the three-dimensional patterning unit 13, as the patterned data F(x), the input of the peak 1 coefficient data to the peak n coefficient data corresponding to each of band signals in which peaks are detected. The noise determining unit 14 receives, from the matching table 15, as the reference pattern data P(x), data of the matching range (the upper limit value and the lower limit value) of the coefficients a and b and the coefficient ratio −c/a (or the coefficient c) associated with the divided frequencies (the data positions) respectively corresponding to the peak 1 coefficient data to the peak n coefficient data.

Subsequently, as comparison processing, the noise determining unit 14 determines whether each of the coefficients a and b and the coefficient ratio −c/a indicated by the peak 1 coefficient data is included in the matching range of the coefficients a and b and the coefficient ratio −c/a associated with the same divided frequencies (data positions).

If all of the coefficients a and b and the coefficient ratio −c/a indicated by the peak 1 coefficient data are included in the matching range, the noise determining unit 14 determines that the band signal as a source of the peak 1 coefficient data is noise sound. In other words, the noise determining unit 14 obtains a determination result that noise is present. On the other hand, if at least one of the coefficients a and b and the coefficient ratio −c/a indicated by the peak 1 coefficient data is not included in the matching range, the noise determining unit 14 obtains a determination result that noise is absent.

Concerning each of the other peak 2 coefficient data to peak n coefficient data, the noise determining unit 24 determines, in the same manner as explained above, presence or absence of noise concerning the divided frequencies corresponding thereto on the basis of whether all the coefficients a and b and the coefficient ratio −c/a indicated by the coefficient data are included in the matching range.

In this way, in this embodiment, presence or absence of noise is determined for each of the divided frequencies.

As the algorithm for determining presence or absence of noise explained above, other algorithms are conceivable. For example, it is conceivable to adopt an algorithm for determining that noise is present if not all but at least a fixed number or more of coefficients indicated by coefficient data are included in a matching range. It is also conceivable to adopt an algorithm for calculating, concerning a coefficient value indicated by coefficient data, an evaluation value corresponding to a distance corresponding to a reference value in a matching range and determining presence or absence of noise on the basis of the evaluation value.

The three-dimensional patterning unit 13 executes, after applying peak detection to the band signals at the respective divided frequencies with the peak detecting unit 21, the polynomial operation/normalization processing only for a band signal in which a peak is detected.

In this embodiment, it is also possible to adopt a configuration in which the peak detecting unit 21 is omitted not to perform peak detection. In this case, the polynomial operation/normalization units 22-1 to 22-n are provided to correspond to the respective divided frequencies. In correspondence to FIG. 3, since the number of data, i.e., the number of divisions of the divided frequencies is 512, 512 polynomial operation/normalization units 22-1 to 22-512 are provided to correspond to the number of divisions. However, as shown in FIG. 12, when a frequency characteristic of noise sound is limited to a part of all the frequency bands obtained after the FFT, the polynomial operation/normalization units 22 corresponding to respective divided frequencies included in a frequency band corresponding to noise sound only have to be provided.

The polynomial operation/normalization units 22-1 to 22-n in this case steadily execute the polynomial operation and the normalization processing for each of samples of input band signals and sequentially output coefficient data. If the band signal is noise, the coefficient data output in this way is included in the matching range of the matching table 15. If the band signal is not noise, the coefficient data deviates from the matching range.

Therefore, the noise determining unit 14 compares coefficient data for each of the divided frequencies (band signals) steadily output from the three-dimensional patterning unit 13 as the patterned data F(x) and the reference pattern data P(x) read out from the matching table 15, i.e., the matching range of the coefficients for each of the divided frequencies. As a result of the comparison, for example, if coefficient values indicated by the coefficient data are included in the matching range, the noise determining unit 14 determines that noise is present in the band signal. If the coefficient values are not included in the matching range, the noise determining unit 14 determines that noise is absent.

However, in the case of the configuration in which the peak detection by the peak detecting unit 21 is omitted as explained above, the polynomial operation/normalization units 22-1 to 22-n need to steadily execute the polynomial operation and the normalization processing. The noise determining unit also needs to steadily execute the processing for determining presence or absence of noise. Therefore, the processing of the noise reducing device is substantially heavy.

Therefore, in this embodiment, the peak detection is performed as explained above. The "noise that temporally intermittently and irregularly occurs" set as a removal target in this embodiment has a characteristic that the noise relatively steeply rises as explained above. Therefore, when noise occurs, a properly conspicuous peak is obtained. This means that it may be regarded that noise does not occur in a state in which a peak is not detected. Therefore, even if the polynomial operation/normalization processing and the processing for determining presence or absence of noise are performed only when a peak is detected, detection of noise occurrence is not missed. Since it is unnecessary to steadily perform the polynomial operation/normalization processing and the processing for determining presence or absence of noise, the processing of the noise reducing device is light. For example, resources necessary for the processing can be saved.

In this way, the noise determining unit 14 according to this embodiment can determine presence or absence of noise. When necessary, together with information concerning a determination result of noise presence or absence, the noise determining unit 14 can output, as noise recognition information, for example, the arithmetic operation result acquired in a process for obtaining the determination result of noise presence or absence.

Figure 13:
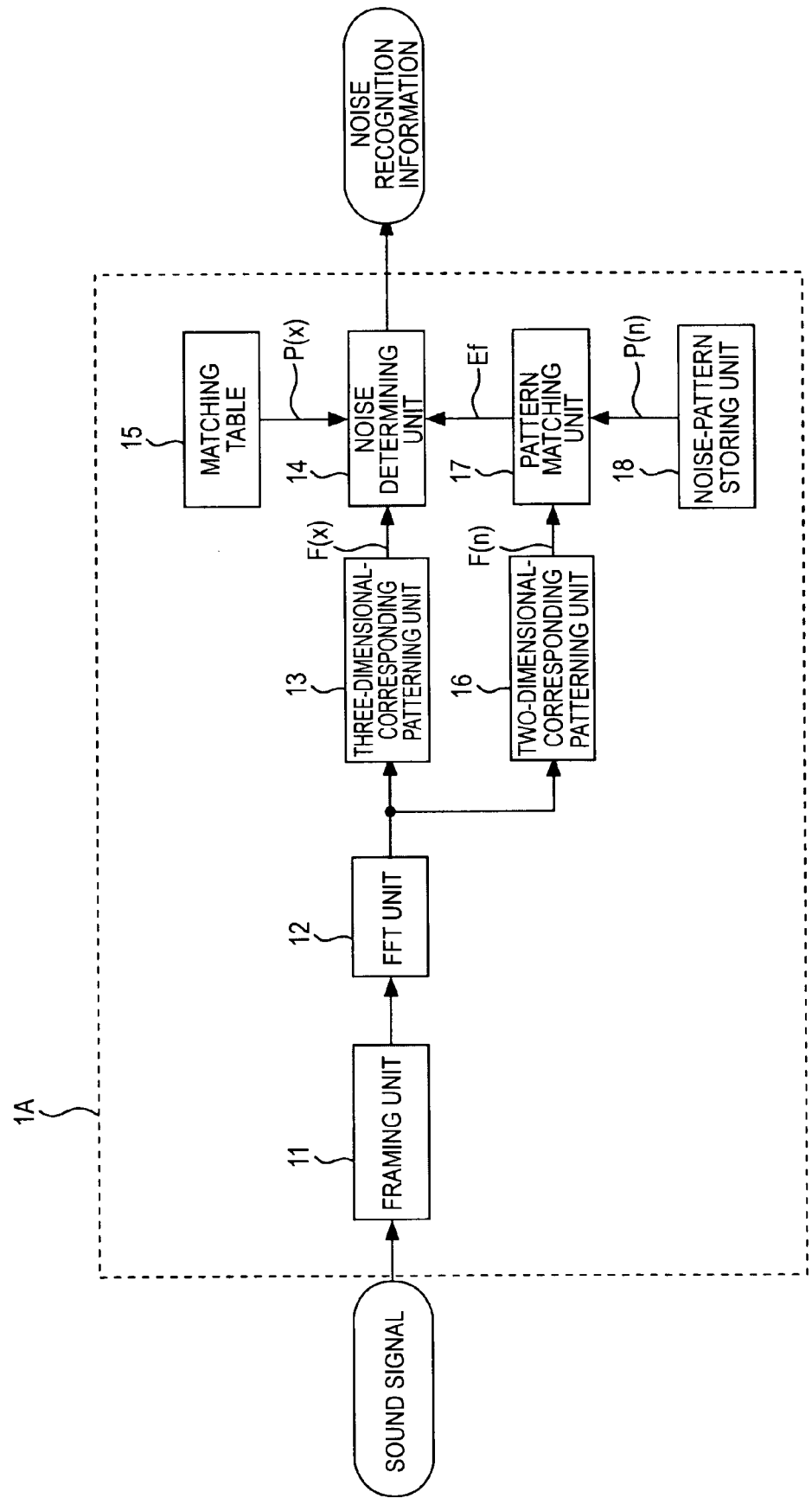
FIG. 13 is a block diagram of a configuration example of a noise-recognition processing unit (a second example) according to the embodiment.

3. Configuration Example (Second Example) of the Noise-Recognition Processing Unit FIG. 13 is a diagram of another configuration example (a second example) of the noise-recognition processing unit. In the figure, components same as those shown in FIG. 2 are denoted by the same reference numerals and signs and explanation of the components is omitted.

In a noise-recognition processing unit 1A shown in the figure, a two-dimensional patterning unit 16, a pattern matching unit 17, and a noise-pattern storing unit 18 are added to the configuration shown in FIG. 2.

The two-dimensional patterning unit 16 captures data after the FFT processing by the FFT unit 12 ((b) and (c) of FIG. 3) and stores the data as the frequency signal F(n). In this embodiment, processing for storing and obtaining the frequency signal F(n) two-dimensionally represented by the frequency axis (the F axis) and the amplitude (the A axis) is regarded as patterning of a sound signal.

The noise-pattern storing unit 18 is a memory that stores a noise pattern P(n). Data of the noise pattern P(n) can be obtained by modeling a frequency distribution of assumed noise sound.

As pattern matching processing, the pattern matching unit 17 calculates a correlation degree Ef between the frequency signal F(n) and the noise pattern P(n).

The correlation degree Ef can be calculated by, for example, the following Formula (9).

$$Ef = \frac{\sum_{n=1}^{N}\{F(n) \times P(n)\}}{\sqrt{\sum_{n=1}^{N}\{F(n)\}^2 \times \sum_{n=1}^{N}\{P(n)\}^2}} \quad (9)$$

In Formula (9), N represents the number of FFT points (sample points) in one frame. Specifically, the correlation degree Ef approaches 1 as correlation between a noise pattern for sample points n=1 to N and a sound signal is higher. In other words, as the correlation degree Ef is closer to 1, it is more likely that the sound signal is noise.

In the configuration shown in FIG. 13, the noise determining unit 14 captures a value of the correlation degree Ef.

Basically, in the same manner as explained above, the noise determining unit 14 determines presence or absence of noise by comparing a coefficient pattern of each of band signals and the matching range of the matching table 15. However, in FIG. 13, a determination element for determining whether threshold abnormality set in advance occurs concerning the correlation degree Ef is added to the determination result obtained by using the matching table 15. Specifically, as noise determination corresponding to one band signal, the noise determining unit 14 determines that noise is present when a coefficient pattern of the band signal is included in the matching range of the matching table 15 and a frequency domain has the correlation degree Ef equal to or larger than the threshold. Even if the coefficient pattern of the band signal is included in the matching range of the matching table 15, when a frequency domain has the correlation degree Ef smaller than the threshold, the noise determining unit 14 determines that noise is absent.

This makes it possible to obtain a more accurate determination result of noise presence or absence.

4. Configuration Example (First Example) of the Noise Reducing Device

4-1. Overall Configuration

Figure 14:
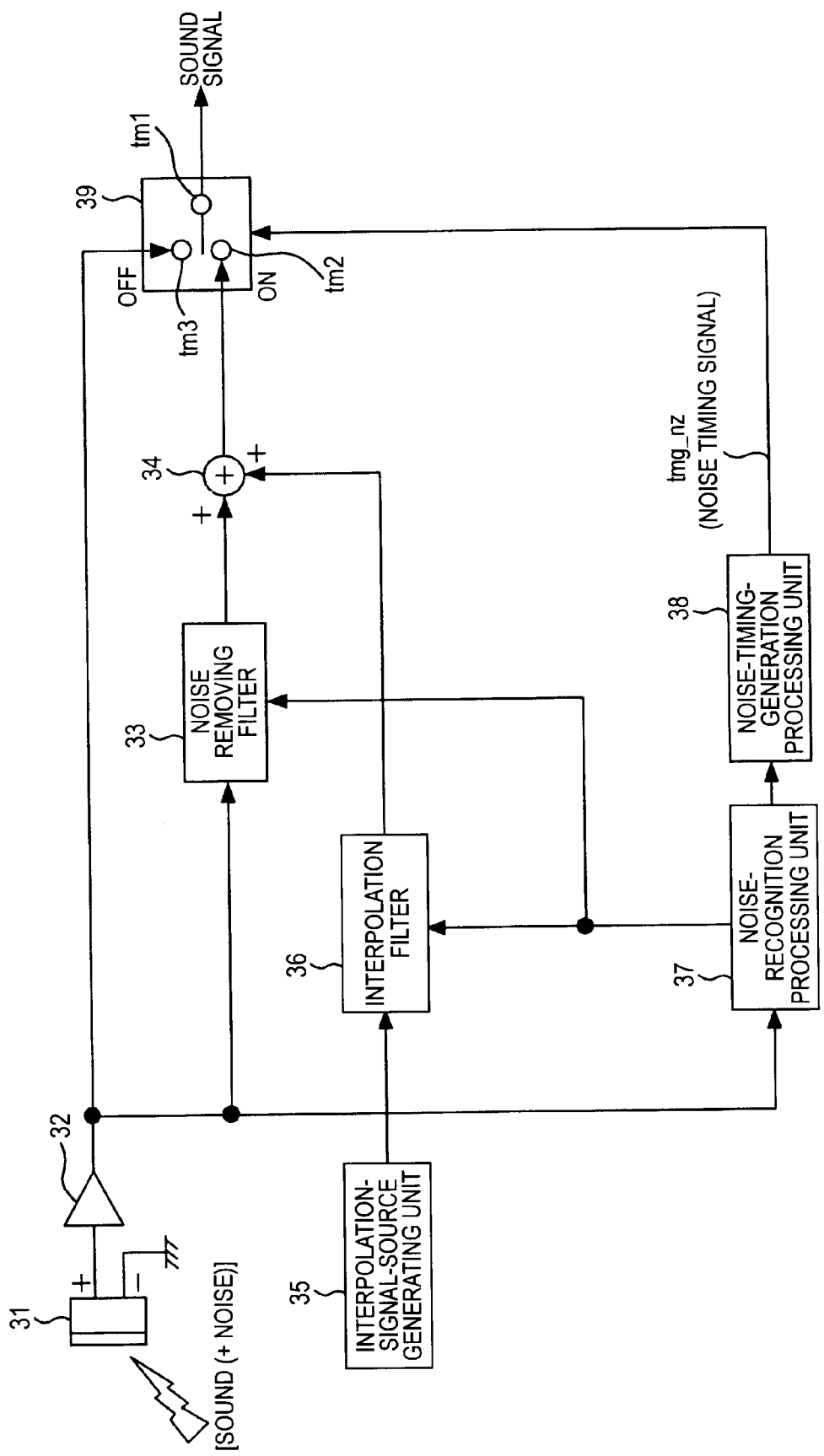
FIG. 14 is a block diagram of a configuration example of a noise reducing device (a first example) according to the embodiment.

FIG. 14 is a diagram of the configuration of a first example of the noise reducing device according to this embodiment including the noise-recognition processing unit 1 as the first example or the noise-recognition processing unit 1A as the second example.

The noise reducing device shown in FIG. 14 includes a microphone 31, an amplifier 32, a noise removing filter 33, an adder 34, an interpolation-signal-source generating unit 35, an interpolation filter 36, a noise-recognition processing unit 37, a noise-timing-generation processing unit 38, and a switch 39.

The microphone 31 is incorporated in an electronic apparatus mounted with the noise reducing device shown in the figure or is externally connected to the electronic apparatus. For example, when the electronic apparatus is a video camera or the like, the microphone 31 is provided for the purpose of collecting recording sound. Noise sound as a removal target in this embodiment is collected by the microphone 31 together with sound that should originally be collected.

Sound input to the microphone 31 is converted into a sound signal and amplified by the amplifier 32.

In this case, the sound signal (the input sound signal) of a digital format output from the amplifier 32 is supplied to a terminal tm3 of the switch 39. The sound signal is divided and input to the noise removing filter 33 and the noise-recognition processing unit 37.

The noise removing filter 33 is a BEF (Band Elimination Filter) or the like. The noise removing filter 33 sets, according to information indicating a frequency (a divided frequency) at which noise is determined as having occurred (noise occurrence frequency indication information) output from the noise-recognition processing unit 37, a frequency that should be interrupted (blocked). Consequently, the sound signal that has passed through the noise removing filter 33 is a sound signal from which a sound component of the frequency at which the noise is determined as having occurred is removed.

The adder 34 combines the sound signal output from the noise removing filter 33 with an interpolation signal output from the interpolation filter 36.

The interpolation signal is generated by the interpolation-signal-source generating unit 35 and the interpolation filter 36.

First, the interpolation-signal-source generating unit 35 generates, as an interpolation signal source, a signal of a frequency characteristic having a frequency band (e.g., in correspondence to FIG. 12, 43.1 Hz to 2.28 kHz) treated as noise in this embodiment.

Figure 16:
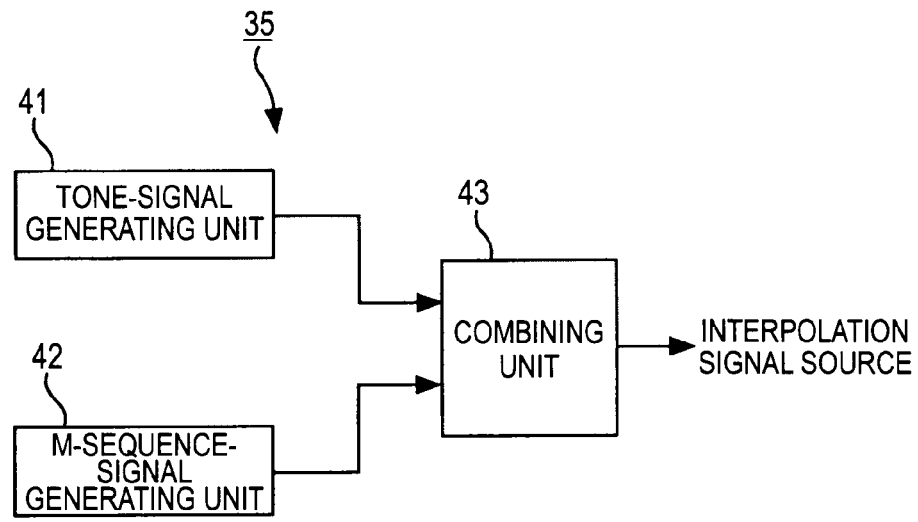
FIG. 16 is a block diagram of a configuration example of an interpolation-signal-source generating unit.

FIG. 16 is a diagram of a configuration example of the interpolation-signal-source generating unit 35.

The interpolation-signal-source generating unit 35 shown in the figure includes a tone-signal generating unit 41, an M-sequence-signal generating unit 42, and a combining unit 43.

The tone-signal generating unit 41 generates a tone signal formed by a single or plural sine wave(s), pulse wave(s), or the like having a predetermined period. The tone signal has a single or plural peak(s) at a predetermined frequency because of a frequency characteristic thereof.

The M-sequence-signal generating unit 42 generates a random signal having a uniform level in all bands, a so-called M-sequence signal. As an example of such a signal, there is white noise.

The combining unit 43 combines, for example, at a combination ratio set in advance, the tone signal generated by the tone-signal generating unit 41 and the M-sequence signal generated by the M-sequence-signal generating unit 42 and outputs a combined signal. The combined signal output from the combining unit 43 is an interpolation signal source.

It is conceivable to adaptively change the combination ratio rather than, for example, fixing the combination ratio. For example, collected sound obtained by the microphone 31 is analyzed to calculate an approximation ratio or the like concerning a tone signal component and an M-sequence signal component. The combination ratio is changed on the basis of the approximation ratio. Consequently, for example when collected sound has a large number of tone signal components, an interpolation signal source formed by combination of components close to the tone signal components can be output. When the collected sound has a large number of M-sequence signals, an interpolation signal source formed by combination of components close to the M-sequence signals can be output. As a result, it is possible to obtain more natural audibility for a sound signal after interpolation.

In some case, the combination ratio may be fixedly set such that only the tone signal or the M-sequence signal is output as the interpolation signal source.

The interpolation signal source output from the interpolation-signal-source generating unit 35 is output to the interpolation filter 36. The interpolation filter 36 is a filter that receives the input of noise occurrence frequency indication information same as that output to the noise removing filter 33. A filter characteristic opposite to that of the noise removing filter 33 is set in the interpolation filter 36. Specifically, an interruption band set in the noise removing filter 33 is set in the interpolation filter 36 as a pass band thereof. A pass band set in the noise removing filter 33 is set in the interpolation filter 36 as an interruption band thereof.

Consequently, an interpolation signal source from which only a band component corresponding to a band interrupted by the noise removing filter 33 is output from the interpolation filter 36. The interpolation signal source is output to the adder 34 as an interpolation signal.

The adder 34 adds up and combines the sound signal output from the noise removing filter 33 and the interpolation signal output from the interpolation filter 36 and outputs a combined signal to a terminal tm2 of the switch 39.

In correspondence to the above explanation, the noise-recognition processing unit 37 has a configuration as the noise-recognition processing unit 1 shown in FIG. 2 or the noise-recognition processing unit 1A shown in FIG. 13. In the noise-recognition processing unit 1 or 1A as the noise-recognition processing unit 37, an input sound signal input by the framing unit 11 changes to a digital collected sound signal obtained by the microphone 31 and the amplifier 32. The noise-recognition processing unit 1 or 1A as the noise-recognition processing unit 37 outputs noise occurrence frequency indication information to the noise removing filter and the interpolation filter 36 as noise recognition information.

When the noise-recognition processing unit 37 determines that noise is present in a certain band signal (divided frequency), the noise-timing-generation processing unit 38 executes processing for determining an occurrence period (a noise occurrence period) of the noise determined as present. An example of processing for determining the noise occurrence period is explained later.

The noise-timing generating unit 38 outputs, on the basis of a determination result, a noise timing signal tmg_ng for indicating temporal timing of the noise occurrence period to the switch 39.

The switch 39 connects a terminal tm1 to the terminal tm3 and directly output the input sound signal output from the amplifier 32 in a period in which the noise timing signal tmg_ng is not output, i.e., when noise does not occur (a noise non-occurrence period).

On the other hand, the switch 39 connects the terminal tm1 to the terminal tm2 and outputs the sound signal output from the adder 34, i.e., the sound signal subjected to the noise removal and interpolation processing in the period in which the noise timing signal tmg_ng is output, i.e., in a period in which noise is determined as having occurred.

For example, when the noise reducing device according to this embodiment is mounted on a recordable apparatus, the sound signal output from the switch 39, i.e., the sound signal output from the noise reducing device is recorded.

In (a) of FIG. 18, the sound signal output from the terminal tm1 of the switch 39 is schematically shown according to the elapse of time. In the figure, time is plotted on the abscissa and power of a sound signal is plotted on the ordinate.

In the figure, the noise occurrence period corresponds to the period in which the noise timing signal tmg_ng is output.

In a period before the noise occurrence period, the sound signal (the input sound signal) directly input from the amplifier 32 is output from the switch 39. In other words, the sound signal not subjected to the noise removal and interpolation processing is output. The sound signal not subjected to the noise removal and interpolation processing output from a period before the noise occurrence period is indicated as a pre-sound signal.

Subsequently, when the noise occurrence period is started according to the start of the output of the noise timing signal tmg_ng, the output of the sound signal not subjected to the noise removal and interpolation processing performed to that point is stopped. Instead, the output of the output signal of the adder 34, i.e., the sound signal subjected to the noise removal and interpolation processing is started.

When the output of the noise timing signal tmg_ng is stopped and the noise occurrence period is determined as having ended, the switch 39 switches the output of the sound signal from the adder 34 (the sound signal subjected to the noise removal and interpolation processing) performed to that point to the output of the sound signal from the amplifier 32 (the sound signal not subjected to the noise removal and interpolation processing). The sound signal not subjected to the noise removal and interpolation processing output in a period after the noise occurrence period is shown as a post-sound signal.

The sound signal subjected to the noise removal and interpolation processing output from the switch 39 over the noise occurrence period can be regarded as a sound signal obtained by combining the noise removed signal and the interpolation signal as schematically shown in (a) of FIG. 18.

The noise removed signal is the sound signal output from the noise removing filter 33. In other words, the noise removed signal is a sound signal obtained by removing a band component of a divided frequency at which noise occurs from the original sound signal. The noise removed signal has signal power lower than that of the original sound signal because the band in which noise occurs is removed. However, since the interpolation signal is a sound signal formed by the frequency band removed from the original sound signal, when the noise removed signal is combined with the interpolation signal by the adder 34, the sound signal subjected to noise removal processing output from the switch 39 has signal power equal to that of the original sound signal. In (a) of FIG. 18, an envelope of the sound signal in the noise occurrence period is connected to envelopes of the pre-signal and the post-signal. This indicates that the signal power (level) of the sound signal subjected to the noise removal processing and that of the original sound signal are equal.

In this embodiment, removal of components of all frequency bands of the original sound signal is not performed in the noise occurrence period (a noise removal period for executing noise removal).

It is also conceivable to adopt, for example, a method of first performing, as noise removal and interpolation, noise removal by removing components of all the frequency bands of the original sound signal in the noise occurrence period and then combining the sound signal subjected to the noise removal with an interpolation signal having all the frequency bands of the original sound signal to generate a sound signal subjected to the noise removal and interpolation processing. However, in this case, since all the bands of the sound signal in the noise occurrence period change to the interpolation signal, sound is unnatural in audibility.

On the other hand, in this embodiment, as it is understood from the operation of the noise removing filter 33 and the interpolation filter 36 explained above, in the noise occurrence (removal) period, the noise removal is performed by removing, from the original sound signal, only the band of the divided frequency at which noise is determined as present. In other words, a frequency band in which noise does not occur in the original sound signal is left. Then, only the sound signal component of the band lost by the noise removal is combined with the interpolation signal and supplemented. Consequently, continuity between sound in the noise occurrence period and sounds before and after the noise occurrence period can be more improved than, for example, in the case of the method explained above. Consequently, a masking effect more effectively works and, as a result, it is possible to obtain natural audibility that does not spoil the original sound.

(b) of FIG. 18 is a diagram of another example of a form concerning combination in the time axis direction of the original sound signal as the pre-signal and the post-signal (the output sound signal of the amplifier 32) and noise removed and interpolation signals (the output sound signal of the adder 34).

In (a) of FIG. 18, at the start point of the noise occurrence period, the pre-signal is instantaneously switched to the noise removed and interpolation signals and, similarly, the noise removed and interpolation signals are instantaneously switched to the post-signal. In the case of such a change of the signals, for example, in a band in which noise removal is performed, the original sound signal component as the pre-signal is instantaneously switched to the interpolation signal and the interpolation signal is instantaneously switched to the original sound signal as the post-signal. Therefore, it is likely that, for example, a harmonic is generated at timing of the switching and is unnaturally heard.

Therefore, in (b) of FIG. 18, a period in which so-called cross fade is performed (a cross-fade period) is provided in which the pre-signal is gradually attenuated and the noise removed and interpolation signals are gradually increased to the original level over a fixed period from the start point of the noise occurrence period. Similarly, a cross-fade period is provided in which the post-signal is gradually increased to the original level and the noise removed and interpolation signals are gradually reduced over a fixed period to the end point of the noise occurrence period.

In this way, in the fixed periods in the beginning and the end of the noise occurrence period, the cross fade of the original sound signal and the noise removed and interpolation signals is performed. This makes it possible to substantially suppress the generation of the harmonic and prevent phenomena such as ringing and overshoot. Therefore, it is possible to obtain more natural audibility.

A level change of the sound signal in the cross-fade period can be realized by configuring the switch 39 with a cross-fade switch. The cross-fade switch combines, for example, input two sound signals via attenuators having a variable control coefficient and outputs the combined sound signals. The control coefficient c is, for example, a value in a range of 0 to 1. The attenuators output sound signals having a level obtained by multiplying the original signal level with c.

In the cross-fade period, a control coefficient $c1$ of one attenuator is changed to increase from 0 to 1 according to the elapse of time. A change calculated as $c2=1-c1$ is given to a control coefficient $c2$ of the other attenuator. Time of the cross-fade period only has to be able to be determined on the basis of the noise timing signal tmg_ng. For example, the noise timing signal tmg_ng is formed to indicate start and end times of the noise occurrence period. For example, the switch 39 as the cross-fade switch executes the cross-fade processing in the beginning in a fixed time from the start time of the noise occurrence period. The switch 39 specifies time back from the end time of the noise occurrence period by the cross-fade period and executes the cross-fade processing in the end in a period from the specified time to the end time of the noise occurrence period.

For example, only the signal subjected to noise removal and interpolation processing, i.e., the sound signal output from the adder 34 may be steadily output from the noise reducing device. However, since the sound signal output from the adder 34 passes through a processing system for noise removal and interpolation even in a period other than the noise occurrence period, the sound signal is deteriorated compared with the input sound signal. Therefore, in the noise reducing device according to this embodiment, the input sound signal from the switch 39 is directly output in the period other than the noise occurrence period such that a sound signal having as high a quality as possible is output.

4-2. Noise Occurrence Period Determination Processing

Processing for determining noise occurrence timing executed by the noise-timing-generation processing unit 38 shown in FIG. 14 is explained with reference to FIG. 19. In the explanation with reference to the figure, for example, a quadratic polynomial is adopted for a polynomial arithmetic operation.

When the noise-recognition processing unit 37 (the noise-recognition processing unit 1 or 1A) determines that noise is present in a certain band signal (divided frequency), the noise-timing-generation processing unit 38 executes processing for determining an occurrence period of the noise.

For example, according to the determination by the noise-recognition processing unit 37 that noise is present, the noise-recognition processing unit 37 passes, for example, coefficient data of the divided frequency at which noise is determined as present to the noise-timing-generation processing unit 38 as noise recognition information.

Figure 19:
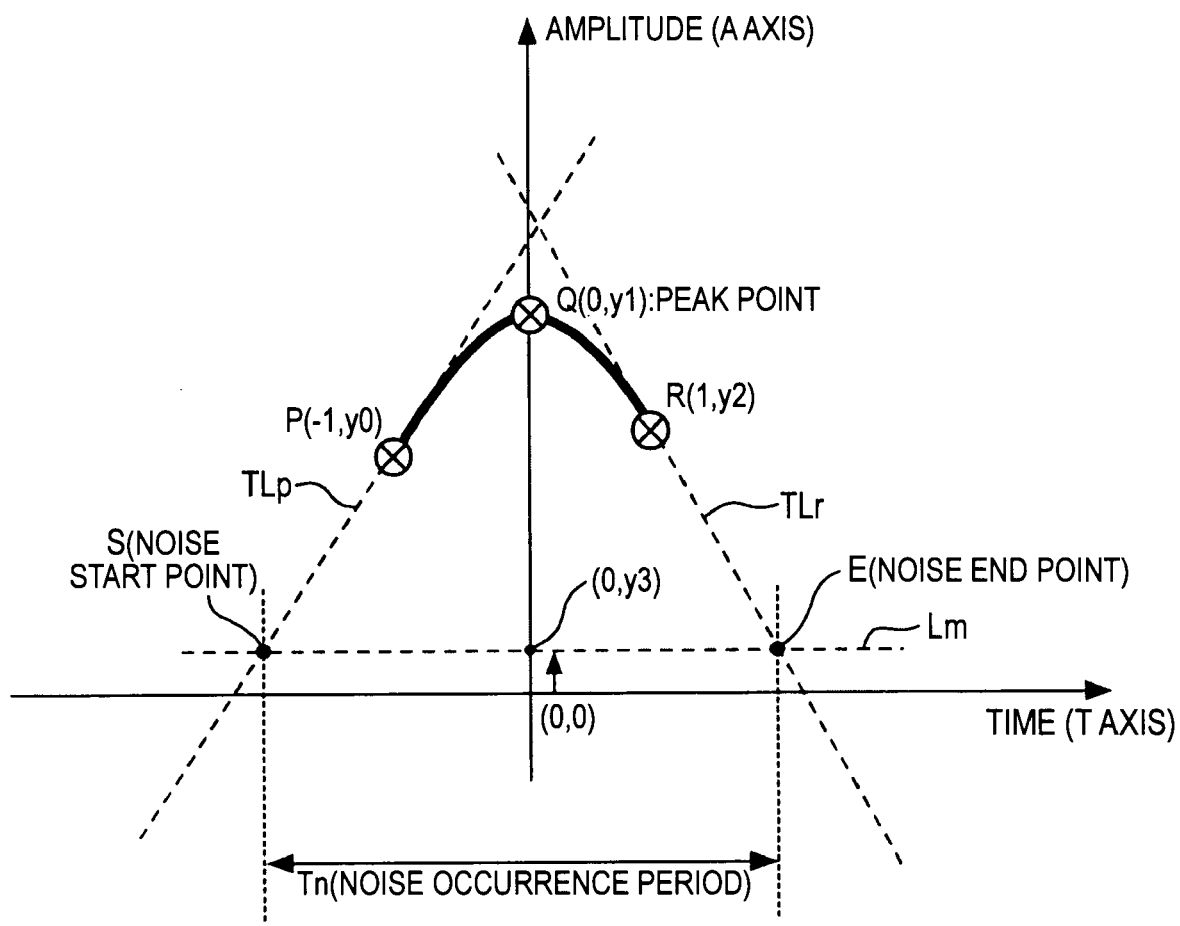
FIG. 19 is a schematic diagram of an example of processing for calculating a noise occurrence period.

The noise-timing-generation processing unit 38 calculates coordinates P, Q, and R shown in FIG. 19 on the basis of a quadratic polynomial represented by the coefficient data of the divided frequency at which noise is determined as present. As coordinate axes shown in FIG. 19, the abscissa represents time and the ordinate (the A axis) represents absolute amplitude Va of a band signal. Concerning the time on the abscissa, time when the quadratic polynomial is the maximum is treated as 0.

The coordinate Q (0, y1) is a coordinate of a maximum of a curve represented by the quadratic polynomial represented by the coefficient data. The coordinate P (−1, y0) is an arbitrary coordinate temporally preceding the coordinate Q on the curve represented by the quadratic polynomial. The coordinate R (1, y2) is an arbitrary coordinate temporally following the coordinate Q on the curve represented by the quadratic polynomial. The coordinate P is a point on the curve where a coordinate value of the time axis is −1. The coordinate R is a point on the curve where a coordinate value on the time axis is 1.

A tangent TLp passing the coordinate P (−1, y0) and a tangent TLr passing the coordinate R (1, y2) are calculated as tangents corresponding to the curve of the quadratic polynomial. The tangents TLp and TLr can be represented by, for example, a linear function.

A threshold line Lm is set on the coordinates. As shown in the figure, the threshold line Lm is a straight line parallel to a time axis represented by x=y3. y3 that is a threshold in this case is a value calculated to be represented as $y3=y1*a$ ($a<1$) with respect to the maximum y1. In other words, the threshold y3 is calculated as a value smaller than the maximum by a fixed ratio. Specifically, it is conceivable to set the threshold y3 to about 10% (a=0.1) of the maximum y1.

An intersection coordinate of the threshold line Lm and the tangent TLp is calculated. In this embodiment, time to which the x coordinate of the intersection coordinate actually corresponds is set as a start point of occurred noise, i.e., a noise start point S.

Similarly, an intersection coordinate of the threshold line Lm and the tangent TLr is calculated. Time to which the x coordinate of the intersection coordinate actually corresponds is set as an endpoint of the occurred noise, i.e., a noise end point E.

In other words, a detected noise occurrence period Tn is, as shown in the figure, a period from the time as the noise start point S to the time as the noise end point E.

The noise-timing-generation processing unit 38 executes detection of such a noise occurrence period for each of band signals (divided frequencies) in which noise is determined as present.

For the detection (determination) of the noise occurrence period, a polynomial calculated by using sampling points of the band signals is used. By polynomializing the band signals, as explained above, it is possible to obtain a band signal waveform closer to a true band signal waveform. This makes it possible to perform determination of presence or absence of noise at high accuracy for each of the divided frequencies. The noise occurrence period is calculated on the basis of the same polynomial. Therefore, it is possible to detect, for example, start and end times of the noise occurrence period at accuracy higher than that in the past.

Then, the noise-timing-generation processing unit 38 generates the noise timing signal tmg_ng on the basis of the noise occurrence period determined for each of the divided frequencies as explained above.

As an example, the noise-timing-generation processing unit 38 calculates an OR of noise occurrence periods determined for the divided frequencies and sets an output of the OR as the noise timing signal tmg_ng. The noise timing signal tmg_ng in this case is obtained as a signal that is at an H level in a period in which it is determined that noise occurs at least one divided frequency and is at an L level when it is determined that noise occurs at none of the divided frequencies. The switch 39 connects the terminal tm2 and the terminal tm1 when the noise timing signal tmg_ng is at the H level and outputs the sound signal subjected to the noise removal processing (the output sound signal of the adder 34). The switch 39 connects the terminal tm3 and the terminal tm1 when the noise timing signal tmg_ng is at the L level and outputs the sound signal not subjected to the noise removal processing (the output sound signal of the amplifier 32).

5. Configuration Example (Second Example) of the Noise Reducing Device

Figure 15:
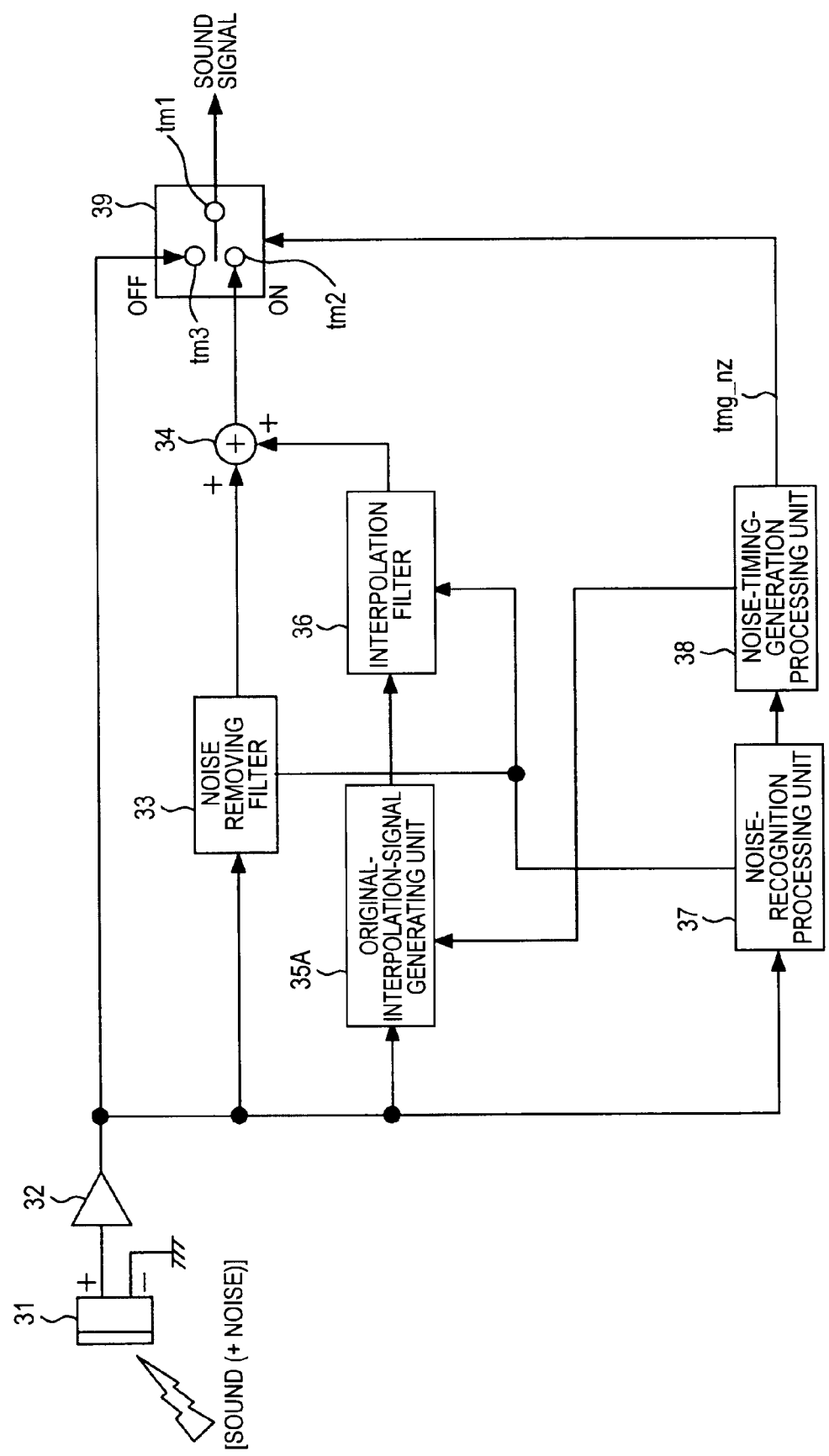
FIG. 15 is a block diagram of a configuration example of a noise reducing device (a second example) according to the embodiment.

FIG. 15 is a diagram of the configuration of a second example of the noise reducing device according to this embodiment. In the figure, components same as those shown in FIG. 14 are denoted by the same reference numerals and signs and explanation of the components is omitted.

In the figure, an original-interpolation-signal generating unit 35A is provided instead of the interpolation-signal-source generating unit 35 shown in FIG. 14.

An original sound signal from the amplifier 32 is input to the original-interpolation-signal generating unit 35A. Noise recognition information from the noise-timing-generation processing unit 38 is input to the original-interpolation-signal generating unit 35A.

The interpolation-signal-source generating unit 35 shown in FIG. 14 is configured to independently generate an interpolation signal source, i.e., a signal as a source of an interpolation signal. However, the original-interpolation-signal generating unit 35A shown in FIG. 15 generates a sound signal as a source of an interpolation signal on the basis of the sound signal input from the amplifier 32 (an input sound signal). The sound signal generated by the original-interpolation-signal generating unit 35A is referred to as original interpolation signal and distinguished from an interpolation signal as white noise or the like generated by the interpolation-signal-source generating unit 35 shown in FIG. 14.

Processing for generating the original interpolation signal by the original-interpolation-signal generating unit 35A is explained below with reference to FIG. 17.

Figure 17:
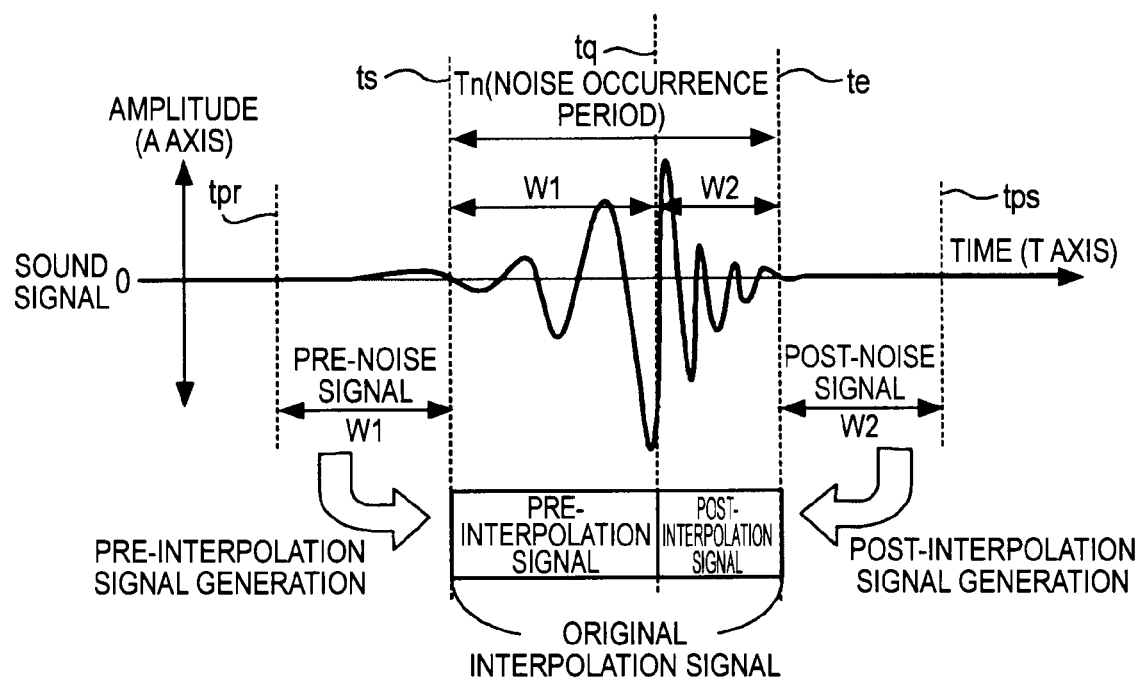
FIG. 17 is a schematic diagram of an example of interpolation signal generation processing in the noise reducing device of the second example.

FIG. 17 is a diagram of a waveform of the original sound signal. In the figure, the abscissa represents time (the T axis) and the ordinate represents amplitude (the A axis).

The original-interpolation-signal generating unit 35A receives, as noise recognition information from the noise-timing-generation processing unit 38, the input of a signal indicating time as noise occurrence periods ts to te and a signal indicating time when a sound signal (i.e., noise sound) in a noise occurrence period is at a peak (peak time tq).

The signal indicating the time as the noise occurrence periods ts to te only has to be, for example, a signal same as the noise timing signal tmg_ng output to the switch 39 by the noise-timing-generation processing unit 38. The signal indicating the peak time tq can be calculated from, for example, noise recognition information (a coefficient of a normalized polynomial) captured from the noise-recognition processing unit 37. Consequently, the original-interpolation-signal generating unit 35A can recognize start time ts and end time te when occurrence of noise starts and ends in a sound signal and the peak time tq when the amplitude of the noise that occurs in the sound signal is at the peak.

As explained above, the noise occurrence periods ts to te indicated by the noise timing signal tmg_ng correspond to an OR of noise occurrence periods of one or more divided frequencies. Therefore, as a state of the sound signal shown in FIG. 17, noise occurs in the noise occurrence periods ts to te but noise does not occur before the time ts and after the time te.

As shown in FIG. 17, the original-interpolation-signal generating unit 35A generates a pre-interpolation signal, generates a post-interpolation signal, and combines the pre-interpolation signal and the post-interpolation signal to generate an original interpolation signal.

First, as processing for generating the pre-interpolation signal, the original-interpolation-signal generating unit 35A calculate time width (time length) W1 from the start time ts to the peak time tq in the noise occurrence period. Subsequently, the original-interpolation-signal generating unit 35A calculates a point tpr back from the start time ts by the time width W1. The original-interpolation-signal generating unit 35A acquires, as the pre-interpolation signal, a sound signal in a section of a period tpr to ts, i.e., a sound signal (a pre-noise signal) in a section of the time width W1 immediately before the start time ts.

As processing for generating the post-interpolation signal, the original-interpolation-signal generating unit 35A calculates time width W2 from the peat time tq to the end time te in the noise occurrence period and calculates a point tps ahead of the end time te by the time width W2. The original-interpolation-signal generating unit 35A acquires, as the post-interpolation signal, a sound signal in a section of a period te to tps, i.e., a sound signal (a post-noise signal) in a section of the time width W2 immediately after the end time te.

The original-interpolation-signal generating unit 35A connects the pre-interpolation signal and the post-interpolation signal generated as explained above such that the pre-interpolation signal is earlier and the post-interpolation signal is later. The sound signal formed by connecting the pre-interpolation signal and the post-interpolation signal has time length as the noise occurrence period as shown in FIG. 17. This sound signal is an original interpolation signal.

The interpolation filter 36 receives the input of the original interpolation signal generated by the original-interpolation-signal generating unit 35A as explained above. As in the case of the first example, the interpolation filter 36 allows, on the basis of noise occurrence frequency indication information same as that output to the noise removing filter 33, only a band component corresponding to the band interrupted by the noise removing filter 33 to pass and outputs the band component to the adder 34 as an interpolation signal.

In this case, as in the case explained above, the sound signal output from the adder 34 is a sound signal generated by interrupting only a divided frequency band, in which noise is determined as having occurred, with the noise removing filter 33 and removing a noise component and then supplementing a frequency lost by the noise removal filter 33 with the interpolation signal. In other words, a sound signal subjected to noise removal and interpolation processing is obtained.

In the second example, as shown in FIG. 17, the interpolation signal (the original interpolation signal) is generated by using the sound signal sections immediately before and immediately after the noise occurrence period. The sound signals immediately before and immediately after the noise occurrence period are sound signals in which noise does not occur in all bands. Since the sound signals are sound signals temporally immediately before and immediately after the noise occurrence period, relation and continuity with sound other than noise obtained in the noise occurrence section are strong.

In other words, it can be said that, in this embodiment, a sound signal in which noise does not occur and that has sound content having high continuity with sound content of the noise occurrence section is used as the interpolation signal. This makes it possible to expect that more natural audibility is obtained in sound subjected to the noise removal processing.

For example, as simpler original interpolation signal generation processing by the original-interpolation-signal generating unit 35A, it is also conceivable to generate the original interpolation signal only with the pre-noise signal or the post-noise signal. This processing is the same as processing for generating the original interpolation signal shown in FIG. 22 explained later.

However, the sound content of the sound signal could change before noise occurrence and after the noise occurrence. For example, the sound content tends to change after a peak of occurred noise. Therefore, priority is given to acquisition of natural audibility, as shown in FIG. 17, it is desirable to generate the pre-interpolation signal and the post-interpolation signal and set a connection point of the pre-interpolation signal and the post-interpolation signal at time corresponding to a peak of noise in the noise occurrence period.

As a modification of the generation of the original interpolation signal with the pre-interpolation signal and the post-interpolation signal, for example, it is also conceivable to adopt a method of simply connecting the pre-interpolation signal and the post-interpolation signal at a boundary point fixedly set in advance such as an intermediate point of the noise occurrence period.

6. Configuration Example (Third Example) of the Noise Reducing Device

6-1. Overall Configuration Example

A third and fourth examples of the noise reducing device according to this embodiment are explained below. Concerning the third and fourth examples, interpolation signal generation processing based on a pitch period explained later is applied.

Figure 20:
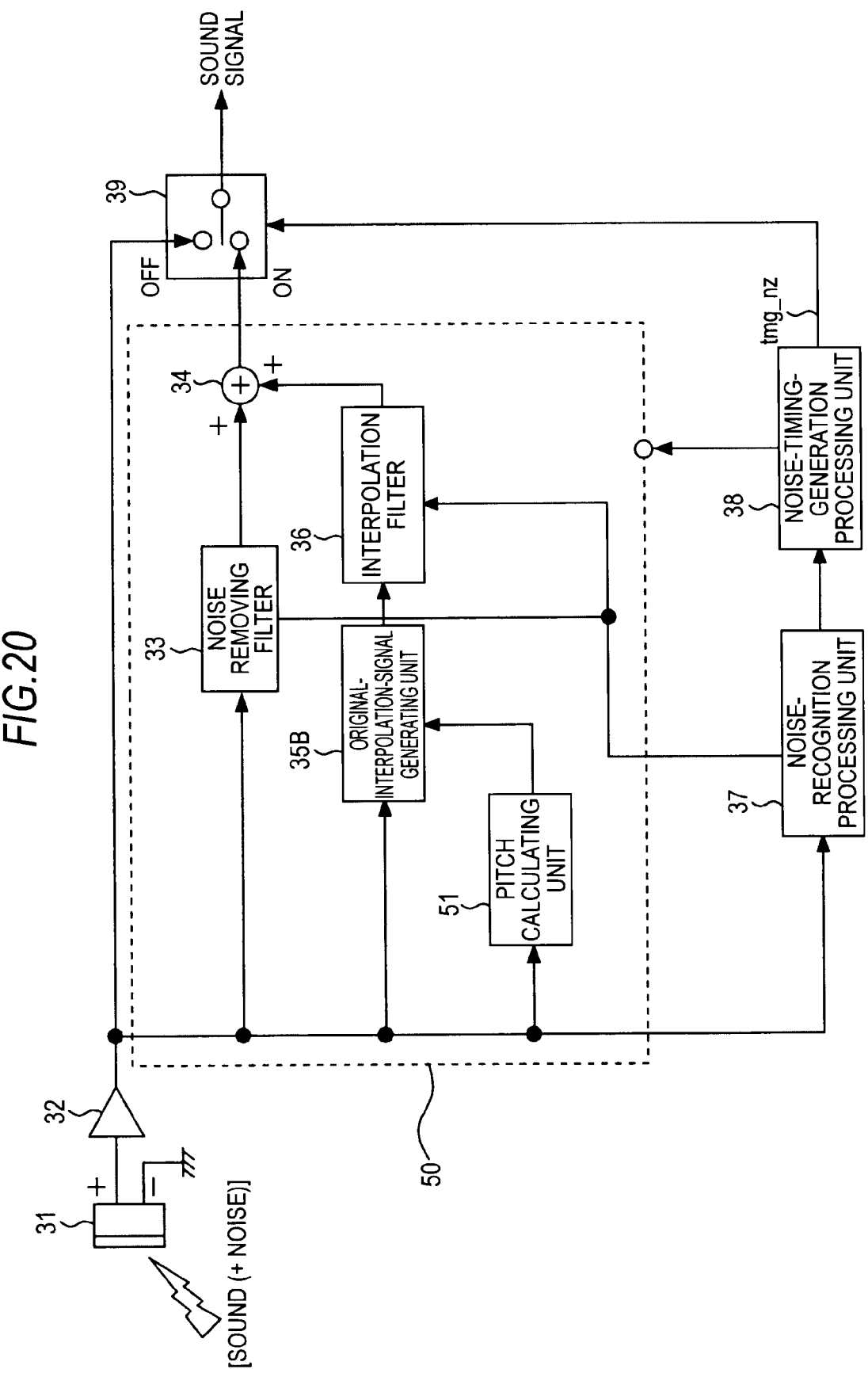
FIG. 20 is a block diagram of a configuration example of a noise reducing device (a third example) according to the embodiment.

FIG. 20 is a diagram of a configuration example as the third example of the noise reducing device according to this embodiment. The configuration shown in the figure can be regarded as a configuration in which the interpolation signal generation processing in the noise reducing device shown in FIG. 15 as the second example is performed on the basis of the pitch period. In the figure, components same as those shown in FIG. 15 are denoted by the same reference numerals and signs and explanation of the components is omitted.

In the configuration shown in the figure, a pitch calculating unit 51 is added to the configuration shown in FIG. 15. An original-interpolation-signal generating unit 35B that generates an original interpolation signal in interpolation signal generation processing based on a pitch (pitch-based interpolation signal generation processing) for an input sound signal (a sound signal in use) is provided instead of the original-interpolation-signal generating unit 35A shown in FIG. 15.

In the figure, a section including the noise removing filter 33, the adder 34, the interpolation-signal-source generating unit 35, the original-interpolation-signal generating unit 35B, the interpolation filter 36, and the pitch calculating unit 51 is represented as noise removal and interpolating unit 50. The noise-timing-generation processing unit 38 outputs noise recognition information to the noise removing and interpolating unit 50.

The pitch calculating unit 51 receives the input of an input sound signal from the amplifier 32 and calculates a pitch of the input sound signal. The pitch means period time corresponding to a basic frequency in the sound signal.

Various methods are known as a method of calculating a pitch. As an example, an AMDF (Average Magnitude Difference Function) is briefly explained. The AMDF is known as a method having relatively high pitch extraction accuracy although the method has only an addition and a subtraction as arithmetic processing and is simpler and is lighter in processing than processing employing, for example, autocorrelation or FFT.

A pitch by the AMDF can be calculated by the following Formula (10).

$$D(m) = (1/N) \cdot \sum_{n=1}^{N} |X(n) - X(n-m)| \qquad (10)$$

In Formula (10), X represents an input signal clipped in a time window of time 1 to N and D(m) represents a sum of differences in a time difference m of the input signal X. m for minimizing a value of D(m) is calculated as a pitch. The value of D(m) is minimized when a phase difference between two signals x is 360°, i.e., same waveform shapes overlap because a time difference of one period occurs.

Information concerning the pitch calculated as explained above is input to the original-interpolation-signal generating unit 35B and used for generation of an original interpolation signal.

The original interpolation signal generated by the original-interpolation-signal generating unit 35B is a sound signal having a frequency band corresponding to the input sound signal. Like the noise reducing devices of the first and second examples, the interpolation filter 36 sets a filter characteristic for allowing only a frequency at which noise is determined as having occurred indicated by the noise recognition information input from the noise-recognition processing unit 37 to pass and allows the original interpolation signal to pass. Consequently, an interpolation signal having a band characteristic of only the frequency at which noise is determined as having occurred is obtained and input to the adder 34.

The adder 34 combines the sound signal from the noise removing filter 33 and the interpolation signal and outputs a combined signal as a sound signal subjected to the noise removal and interpolation processing.

6-2. Interpolation Signal Generation Processing Base on a Pitch (First Example)

The interpolation signal generation processing (the pitch-based interpolation signal generation processing) based on the pitch of the input sound signal (the sound signal in use) executed in the noise reducing device of the third example shown in FIG. 20 is explained. As the pitch-based interpolation signal generation processing, three forms by first to third examples are explained.

Figure 22:
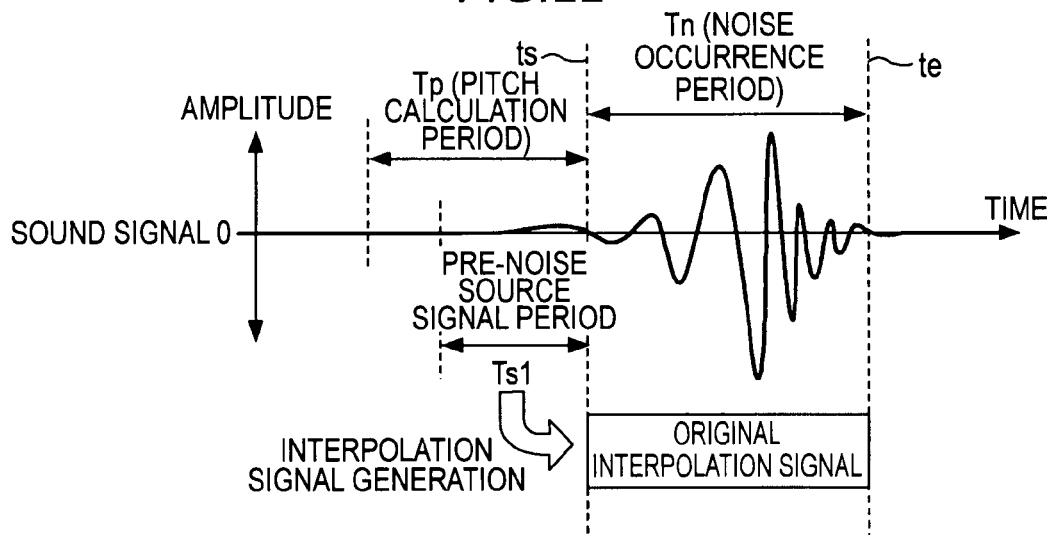
FIG. 22 is a schematic diagram of a flow of pitch calculation and original interpolation signal generation of pitch-based interpolation signal generation processing (a first example and a second example) that can be applied to the noise reducing devices of the third and fourth examples.

FIG. 22 is a schematic diagram of pitch calculation by the pitch calculating unit 51 in the noise reducing device shown in FIG. 20 and a flow until generation of an original interpolation signal (a generated original signal) by the original-interpolation-signal generating unit 35B.

First, the pitch calculating unit 51 shown in FIG. 20 receives the input of a signal indicating the noise occurrence period (e.g., the noise timing signal tmg_ng) as the noise recognition information output from the noise-timing-generation processing unit 38 and recognizes the start time ts of the noise occurrence period Tn.

Subsequently, the pitch calculating unit 51 sets, as a pitch calculation period Tp, a period for a predetermined time temporally before the recognized start time ts and near the noise occurrence period Tn. In an example shown in FIG. 22, the pitch calculation period Tp is set immediately before the start time ts.

The pitch calculating unit 51 executes, using an input sound signal in the pitch calculation period Tp set as explained above, processing for calculating a pitch of the input sound signal according to a method such as the AMDF explained above.

The pitch calculation period Tp is a sound signal section before the noise occurrence period Tn. In other words, a signal in the pitch calculation period Tp is a signal in which noise does not occur in all bands of the input sound signal. In this way, in this embodiment, pitch calculation is performed by using a sound signal in a section in which noise does not occur. This makes it possible to stably obtain an accurate pitch calculation result.

Subsequently, the original-interpolation-signal generating unit 35B receives, for original interpolation signal generation, the input of a signal indicating the noise occurrence period (e.g., the noise timing signal tmg_ng) as the noise recognition information output from the noise-timing-generation processing unit 38 and recognizes time length as the noise occurrence period Tn and start time Ts of the noise occurrence period Tn.

The original-interpolation-signal generating unit 35B sets a pre-noise original signal section Ts1 by time length represented by the noise occurrence period Tn=1.5*Ts1. The pre-noise original signal section Ts1 is set immediately before the start time is in the input sound signal as shown in FIG. 22.

Figure 23:
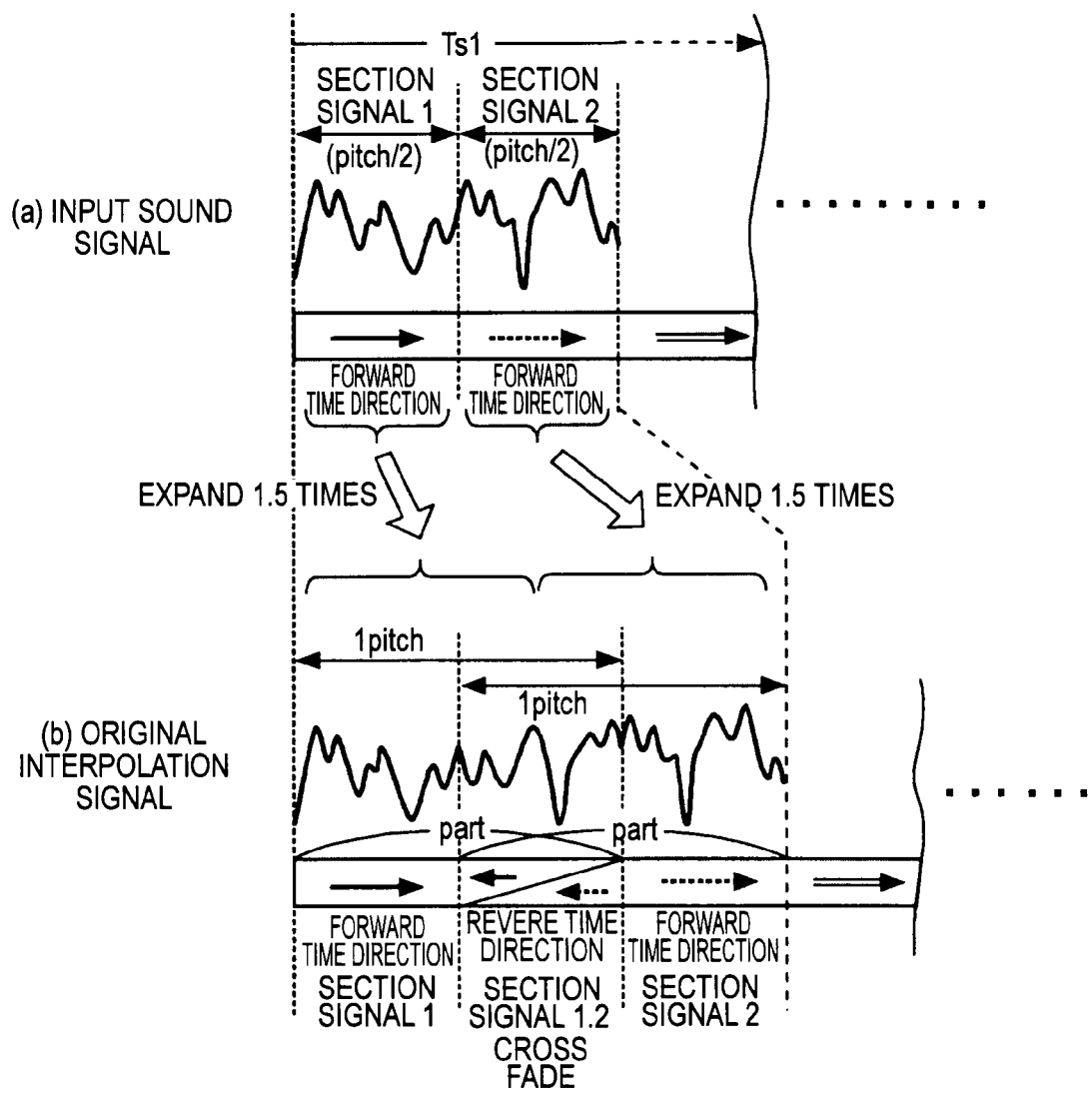
FIG. 23 illustrates schematic diagrams of the pitch-based interpolation signal generation processing of the first example.

The original-interpolation-signal generating unit 35B executes processing for generating an original interpolation signal as shown in FIG. 23 using the input sound signal in the pre-noise original signal section Ts1.

A beginning portion in the input sound signal of the pre-noise original signal section Ts1 is shown in (a) of FIG. 23.

As shown in (a) of FIG. 23, the original-interpolation-signal generating unit 35B divides the input sound signal in the pre-noise original signal section Ts1 in time series in a unit of a half of a period time pitch (=pitch/2) as the pitch calculated by the pitch calculating unit 51. Signal units divided in this way are referred to as section signals 1, 2, and the like according to time order.

As shown in (a) to (b) of FIG. 23 as transition, the original-interpolation-signal generating unit 35B generates an original interpolation signal using the section signals 1, 2, and the like at the pitch/2 period.

Specifically, first, the section signal 1 in the forward time direction is copied to a first pitch/2 period section of the original interpolation signal. The copying only has to be processed to directly read out the section signal 1 of the input sound signal shown in (a) of FIG. 23 in LIFO (Last In First Out). In other words, the section signals only have to be once written in a memory in time series and red out in order same as that during writing.

In the second pitch/2 period section, the section signals 1 and 2 with time series converted into a time direction opposite to that of the original signal are used. As the section signals in the reverse time direction, the section signals of the input sound signal shown in (a) of FIG. 23 are output in FILO (First In First Out). In other words, the section signals are once written in the memory in time series and read out and output in order opposite to that during writing.

Then, the section signals 1 and 2 in the reverse time directions are subjected to combination processing to cross-fade (overlap) each other such that, for example, the section signal 1 is attenuated at 100% to 0% according to the elapse of time and the section signal 2 increases at 0% to 100%. A sound signal obtained in this way is combined as a sound signal for the second pitch/2 period section.

The section signal 2 in the time forward direction is connected in the next third pitch/2 period section.

In this way, in the pitch-based interpolation signal generation processing of the first example, an original interpolation signal for the continuous three pitch/2 period sections is generated by the section signals in the continuous two pitch/2 period section. Subsequently, an original interpolation signal for the next continuous three (fourth to sixth) pitch/2 period sections are generated by using, for example, the next continuous section signals 3 and 4 in the input sound signal in processing same as that for the section signals 1 and 2. Thereafter, the same processing is executed to the end of the pre-noise original signal section Ts1.

In this case, time length of an original interpolation signal formed by using all the section signals forming the pre-noise original signal section Ts1 is represented by 1.5*Ts1 as shown in FIG. 22. In other words, the original interpolation signal in this case can be regarded as being generated by extending the pre-noise original signal section Ts1 in the time direction by length 1.5 times as long as the pre-noise original signal section Ts1.

The interpolation signal generated by arranging the section signals in the period sections set on the basis of the pitch calculated from the input sound signal in this way has a frequency characteristic corresponding to the pitch of the input sound signal. In other words, continuity in terms of the frequency characteristic can be obtained in the input sound signal and the interpolation signal.

In an end position of the first pitch/2 period section in (b) of FIG. 23 and a start position of the second pitch/2 period section, since the same section signals 1 are connected in order of the forward time direction and the reverse time direction, the amplitudes thereof coincide with each other. In other words, it is possible to obtain a state in which an amplitude waveform continues at a boundary between the first and second pitch/2 period sections.

Concerning an end position of the second pitch/2 period section and a start position of the third pitch/2 period section, in the same manner, the same section signals 2 are connected in order of the reverse time direction and the forward time direction. Therefore, a state in which an amplitude waveform continues in a boundary between the second pitch/2 period section and the third pitch/2 period section is obtained. In other words, a state in which the section signals are typically connected in a boundary between the pitch/2 period sections in the original interpolation signal is obtained.

For example, the method of generating an interpolation signal disclosed in JP-A-2008-52772, JP-A-2008-71374, and JP-A-2008-77707 is as explained below.

A weighted addition signal for one pitch period is generated by cross-fading two signal sections for one pitch period before and after a start point of a noise occurrence period. The same one weighed addition signal is repeatedly connected to generate a former half signal for the noise occurrence period. A latter half signal is generated in the same manner. Specifically, a weighted addition signal for one pitch period is generated by cross-fading two signal sections for one pitch period before and after an endpoint of the noise occurrence period and the same one weighted addition signal is repeatedly connected to generate the latter half signal for the noise occurrence period.

Subsequently, the former half signal and the latter half signal generated as explained above are cross-faded to generate an interpolation signal for the noise occurrence period.

The interpolation signal in the patent documents is formed by simply repeatedly connecting the weighted addition signal for one pitch period. When the same signal is simply repeated in this way, noise called beat sound corresponding to this repetition period occurs anew. The beat sound more easily appears as the number of times of repletion increases, for example, when a noise removal period increases or a pitch period decreases.

In the interpolation signal in the patent documents, the weighted addition signal is formed by the cross fade of the two sound singles. The interpolation signal finally obtained is formed by the cross fade of the former half signal and the latter half signal. By cross-fading the signals in this way, continuity former and later sound signals is more easily kept than, for example, a case in which a single sound signal is used.

However, depending on a condition of a phase difference between the two sound signals to be cross-faded, as a result, the sound signals cancel each other. The likelihood of a fall in a signal level is inevitable. If such a level fall occurs, this state is repeated or continues in the period of the noise removal processing. It is anticipated that sufficient effect of interpolation may be unable to be obtained.

The interpolation signal in the patent documents is generated on the basis of the input sound signal. Therefore, in this regard, continuity of the sound signal and the interpolation signals before and after the noise occurrence period is easily obtained. However, a half of the weighted addition signal uses the sound signal in the beginning or the end in the noise occurrence period. Therefore, it is likely that noise is mixed in the interpolation signal. It is anticipated that the noise prevents natural audibility.

On the other hand, according to the pitch-based interpolation signal generation processing according to this embodiment explained with reference to FIGS. 22 and 23, as explained above, a state in which envelopes (amplitude waveforms) of the section signals in the original interpolation signal are connected in a connecting position thereof. Consequently, in this embodiment, occurrence of beat sound due to repetition of the section signals is effectively suppressed. If section signals in the same forward time direction are simply connected, in a connecting position thereof, envelopes steeply change and have conspicuous harmonic components and beat sound tends to occur.

In a connecting position of the same section signals with time directions reversed in the original interpolation signal in this embodiment, although amplitude waveforms thereof are connected, the connection is often point connection and it is difficult to obtain a smooth tangential connection. Therefore, a substantial harmonic component occurs in the connecting position of the section signals with reversed time directions. However, when compared with the state in which the section signals are simply connected and the amplitude waveform becomes discontinuous as explained above, an amount of the harmonic component is small and, therefore, the occurrence of the beat sound can be suppressed.

Further, the original interpolation signal generated by the original-interpolation-signal generating unit 35B is limited, by the interpolation filter 36, to only a frequency at which noise is determined as having occurred. Since the harmonic component occurred according to the point connection is generally completely removed, the harmonic component does not cause a problem.

In the original interpolation signal in this embodiment, as in the interpolation signal in the patent documents, a cross-fade section due to the half pitch period is present. However, as it is understood from (b) of FIG. 23, the cross-fade section appears only once every time the half pitch period continues three times. In other words, the cross-fade section is one third of the entire original interpolation signal. Consequently, compared with, for example, a case in which the cross fade is performed in the entire section of the original interpolation signal, the likelihood of occurrence of a level fall due to a phase condition in the cross-fade section decreases. Even if a level fall occurs, since the level fall ends in a short time, the level fall is less conspicuous.

Further, in this embodiment, since the original interpolation signal is generated by using the input sound signal in the section in which noise does not occur, noise is not mixed in the original interpolation signal. Therefore, it is possible to improve continuity of the interpolation signal and the input sound signals before and after the interpolation signal.

As explained above, in this embodiment, only a frequency band in which noise occurs is removed by the noise removing filter 33. A frequency band in which noise does not occur is kept as the input sound signal. Consequently, continuity of the interpolation signal and the input sound signals before and after the interpolation signal is improved to obtain natural audibility. The same holds true in the noise reducing device that performs the pitch-based interpolation signal generation processing.

In FIG. 22, when the original interpolation signal is generated, the input sound signal before the noise occurrence period Tn is used as the input sound signal in the section in which noise does not occur. However, in the pitch-based interpolation signal generation processing of the first example and pitch-based interpolation signal generation processing of a second example explained next, the input sound signal after the noise occurrence period Tn may be used to generate the original interpolation signal.

In the pitch-based interpolation signal generation processing of the first example, it can be regarded that, as shown in FIG. 23, for each section signal, one section signal in the forward time direction and one section signal in the reverse time direction are connected to form unit interpolation signal portions part and then the unit interpolation signal portions part are arranged on a time axis according to time order of the section signals as the generation sources.

Then, in this case, it can be regarded that a half pitch period section of a last section signal in the former unit interpolation signal portion part and a half pitch period section of a first section signal in the latter unit interpolation signal portion part are superimposed. In the overlapping half pitch period sections, the section signals are combined by cross fade.

The first example can be regarded as processing performed by specifically using two section signals when the unit interpolation signal portion part is formed by using an even number of section signals in the same order (unit period section).

6-3. Interpolation Signal Generation Processing Based on a Pitch (Second Example)

A second example of the pitch-based interpolation signal generation processing according to this embodiment is explained below with reference to FIG. 24.

Figure 24:
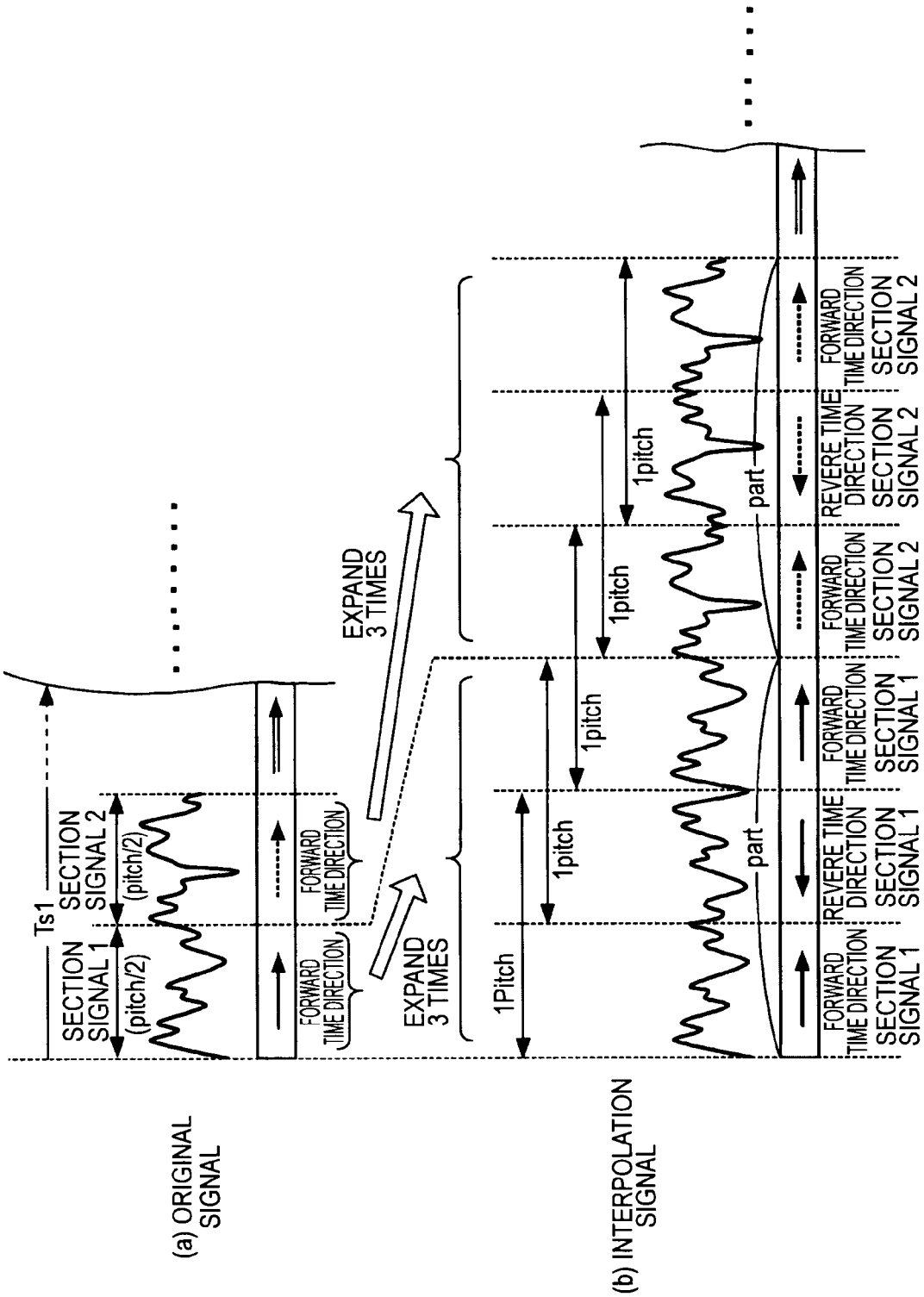
FIG. 24 illustrates schematic diagrams of the pitch-based interpolation signal generation processing of the second example.

FIG. 24 is a diagram of an example in which the unit interpolation signal portion part is formed by a minimum number of (three) section signals when the unit interpolation signal portion part is formed by an odd number of section signals in the same time (unit period section).

Overviews of pitch calculation by the pitch calculating unit 51 in the noise reducing device and generation of an original interpolation signal (a generation source signal) by the original-interpolation-signal generating unit 35B are the same as those of the pitch-based interpolation signal generation processing of the first example as shown in FIG. 22.

In (a) of FIG. 24, as in (a) of FIG. 23, the beginning portion in the input sound signal in the pre-noise original signal section Ts1 is shown. Specifically, the original-interpolation-signal generating unit 353 of the second example divides the input sound signal in the pre-noise original signal section Ts1 into the section signals 1, 2, and the like in the pitch/2 period sections as in the first example.

Then, as shown in (b) of FIG. 24, the original-interpolation-signal generating unit 35B in this case arranges the section signal 1 in the forward time direction in the first pitch/2 period section in the original interpolation signal. Subsequently, the original-interpolation-signal generating unit 35B arranges the section signal 1 in the reverse time direction in the second pitch/2 period section and arranges the section signal 3 in the forward time direction in the third pitch/2 period section.

Subsequently, the original-interpolation-signal generating unit 35 arranges the section signal 2 in the forward time direction in the fourth pitch/2 period section in the original interpolation signal. The original-interpolation-signal generating unit 35 arranges the section signal 2 in the reverse time direction in the fifth pitch/w period section and arranges the section signal 2 in the forward time direction in the sixth pitch/2 period section.

In other words, in the pitch-based interpolation signal generation processing of the second example, one section signal is arranged in order of the forward time direction, the reverse time direction, and the forward time direction and this arrangement is repeated in time series order of the time sections.

In the original interpolation signal formed in this way, the point connection of the envelopes of the amplitude waveforms in the connecting position between the section signals is maintained.

When the unit interpolation signal portion part is formed by the odd number of section signals as in the second example, both of a last section signal of the preceding unit interpolation signal portion part and a first section signal of the following unit interpolation signal portion part can be set in the forward time direction. In other words, in a period including the last section signal of the preceding unit interpolation signal portion part and the first section signal of the following unit interpolation signal portion part, originally, two temporally continuing section signals are directly connected. Therefore, in a boundary between the section signals, amplitude waveforms are point-connected. As a result, a satisfactory state of tangential connection is obtained. In other words, when the unit interpolation signal portion part is formed by the odd number of section signals, the unit interpolation signal portions part only has to be simply connected according to the time order of the section signals as the generation sources.

Consequently, a section in which the section signals cross-fade each other in the original interpolation signal does not have to be formed. Therefore, the problem of the level fall due to a phase condition of two cross-fading signals does not occur.

Further, in this case, the original interpolation signal can have time length extended to three times as large as the pre-noise original signal section Ts1. In other words, Tn=3*Ts1 holds as a relation between the pre-noise original signal section Ts1 and the noise occurrence period Tn corresponding to the original interpolation signal. This means that the pre-noise original signal section Ts1 only has to have time length one third as large as the noise occurrence period Tn. For example, in comparison with the first example, the necessary pre-noise original-signal section Ts1 can be reduced to a half according to the same noise occurrence period Tn.

In this way, in the second example, time of the input sound signal necessary for generation of the original interpolation signal may be short and the processing of the noise reducing device can be lightened. Noise as a removal target in this embodiment is noise that temporally intermittently and irregularly occurs. When a plurality of such noises occur in a short time, in some case, a period in which noise does not occur between the present noise occurrence period and the immediately preceding noise occurrence period is short. However, even in such a case, it is highly likely that a pre-noise original signal in which noise does not occur can be obtained.

6-4. Interpolation Signal Generation Processing Based on a Pitch (Third Example)

A third example of the pitch-based interpolation signal generation processing according to this embodiment is explained with reference to FIGS. 25 and 26.

Figure 25:
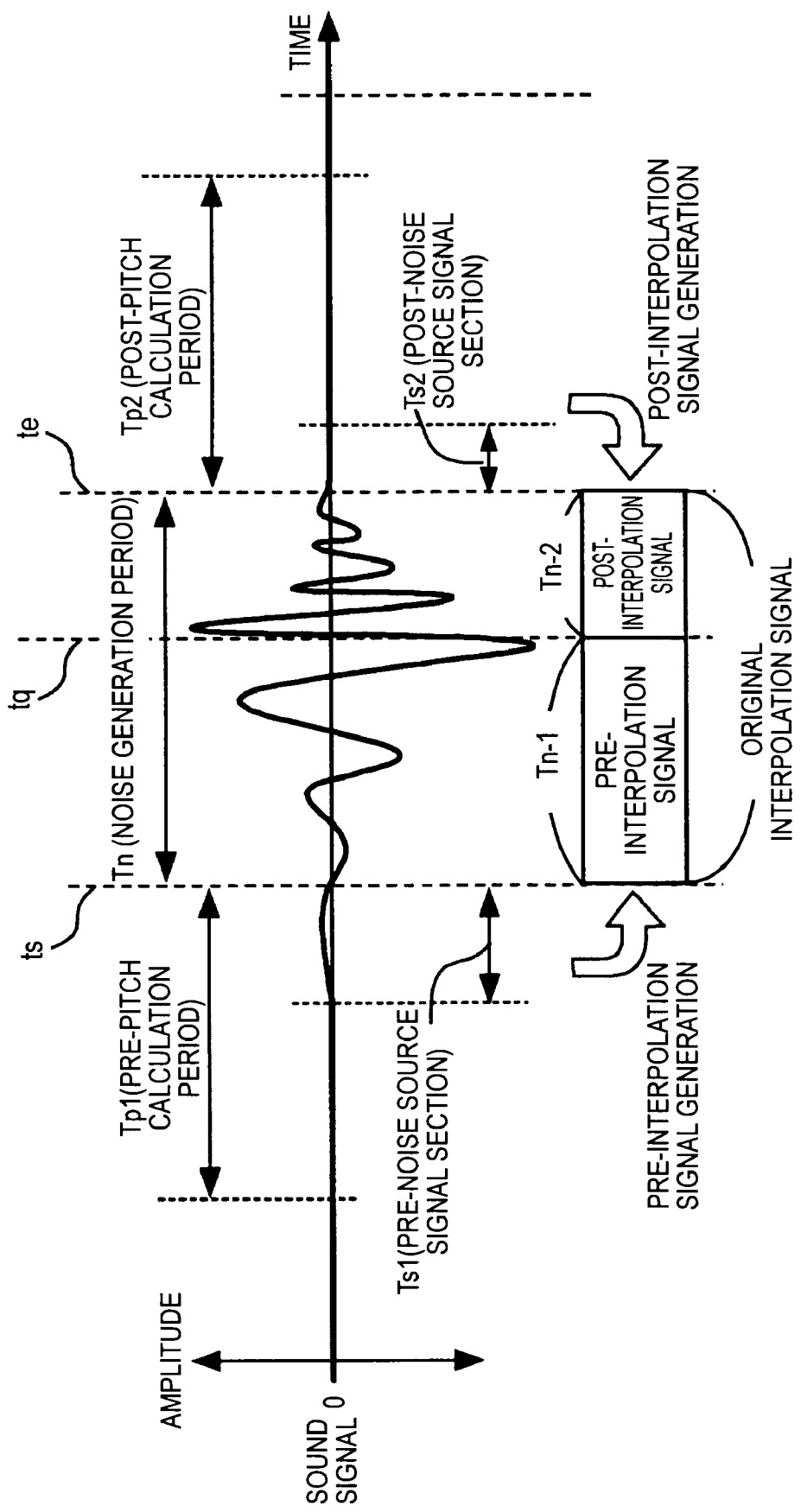
FIG. 25 is a schematic diagram of a flow of pitch calculation and original interpolation signal generation of pitch-based interpolation signal generation processing (a third example) that can be applied to the noise reducing devices of the third and fourth examples.

FIG. 25 is a schematic diagram of pitch calculation by the pitch calculating unit 51 and generation of an original interpolation signal (a generation source signal) by the originalinterpolation-signal generating unit 35B in the noise reducing device corresponding to the third example.

In this case, as in the cases explained above, a signal indicating the noise occurrence period (e.g., noise timing signal tmg_ng) is input to the pitch calculating unit 51 as the noise recognition information output from the noise-timing-generation processing unit 38. The pitch calculating unit 51 recognizes the start time ts and the end time te of the noise occurrence period Tn on the basis of this signal. The pitch calculating unit 51 in this case also recognizes the peak time tp according to a signal indicating the peak time tp of the amplitude of a sound signal (noise sound) in the noise occurrence period Tn output as noise recognition information output from the noise-timing-generation processing unit 38.

As in the case of the first example, the pitch calculating unit 51 sets, in time series of the input sound signal, for example, a fixed period immediately before the start time ts as a pitch calculation period Tp1 and executes pitch calculation using an input sound signal in the pitch calculation period Tp1. A pitch calculated according to the pitch calculation period Tp1 is called pre-pitch.

Further, the pitch calculating unit 51 in this case sets, in the time series of the input sound signal, a period for a predetermined time temporally after the end time te and near the noise occurrence period Tn as a pitch calculation period Tn2. In FIG. 24, the pitch calculation period Tp2 is set immediately after the end time te. The pitch calculating unit 51 calculates a post-pitch using an input sound signal in the pitch calculation period Tp2.

The original-interpolation-signal generating unit 35B receives, for original interpolation signal generation, the input of the noise recognition information from the noise-timing-generation processing unit 38 and recognizes the start time ts, the end time te, and the peak time tp of the noise occurrence period Tn.

As shown in the figure, the original-interpolation-signal generating unit 35B in this case connects a pre-interpolation signal (a preceding generation source signal) and a post-interpolation signal (a following generation source signal) following the pre-interpolation signal to generate an original interpolation signal for the noise occurrence period Tn.

Therefore, the original-interpolation-signal generating unit 35B recognizes time length as a pre-interpolation signal period Tn−1 from the recognized start time ts to peak time tp and calculates, on the basis of the time length of the pre-interpolation signal period Tn−1, time length that should be set as the pre-noise original signal section Ts1 immediately preceding the noise occurrence period.

Similarly, the original-interpolation-signal generating unit 35B recognizes time length as a post-interpolation signal period Tn−2 from the recognized peak time tp to end time te and calculates, on the basis of the time length of the post-interpolation signal period Tn−1, time length that should be set as the post-noise original signal section Ts2 immediately after the noise occurrence period.

A method of calculating the time lengths of the pre-noise signal section Ts1 and the post-interpolation signal period Tn−1 is explained later with reference to FIG. 26.

The pitch-based interpolation signal generation processing executed by the original-interpolation-signal generating unit 35B according to the third example is explained below.

First, in the third example, as in the examples explained above, the original-interpolation-signal generating unit 35B divides the input sound signals in the pre-noise original signal section Ts1 and the post-noise original signal section Ts2 into section signal units at the half pitch period.

Figure 26:
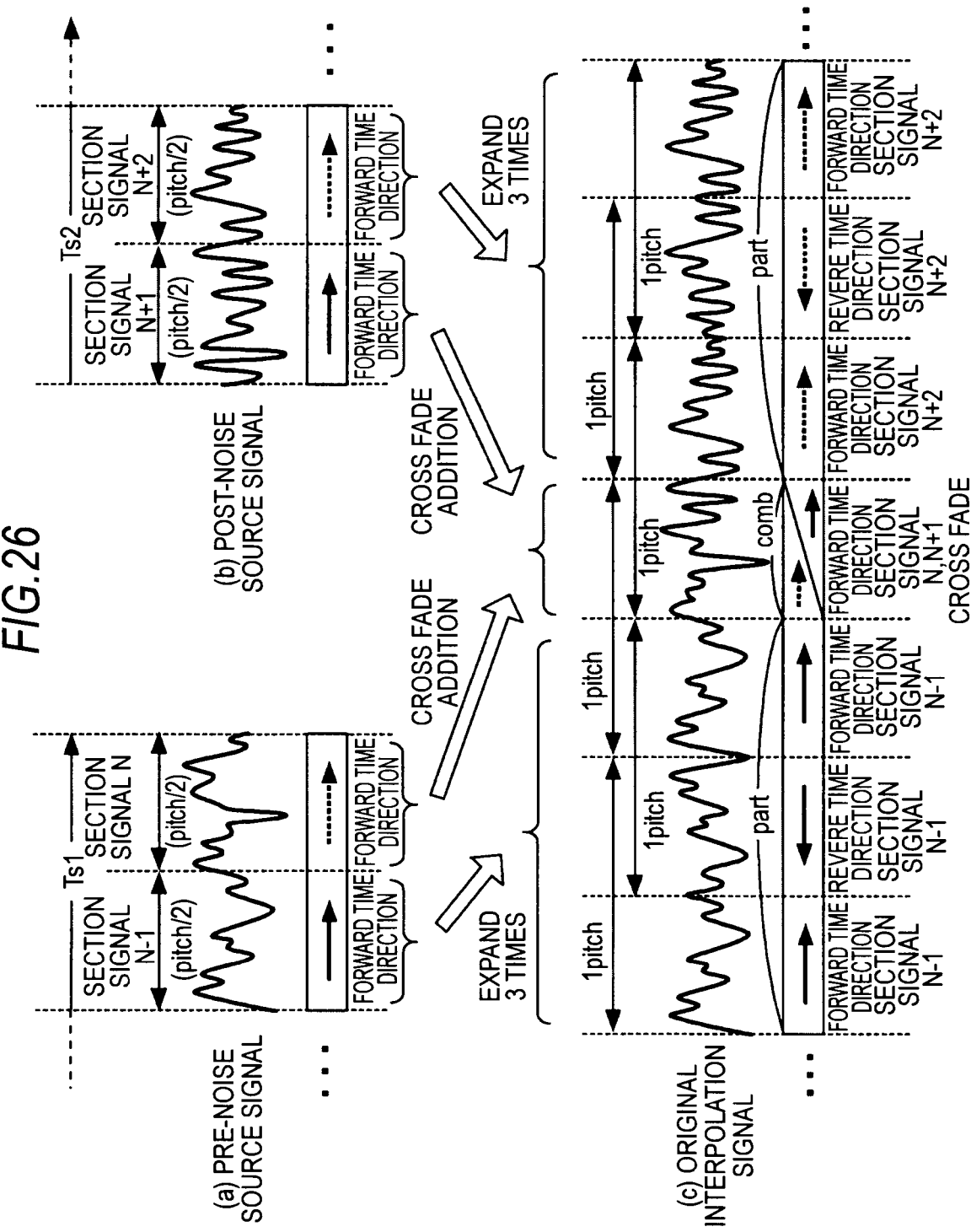
FIG. 26 illustrates schematic diagrams of the pitch-based interpolation signal generation processing of the third example.

In (a) of FIG. 26, as the input sound signal in the pre-noise original signal section Ts1, two section signals N−1 and N at the end of the pre-noise original signal section Ts1 are shown. In (b) of FIG. 26, as the input sound signal in the post-noise original signal section Ts2, two section signals N+1 and N+2 at the end of the post-noise original signal section Ts2 are shown.

As pitch-based interpolation signal generation processing for generating a pre-interpolation signal and a post-interpolation signal, the processing corresponding to the first example (for forming the unit interpolation signal portion part with an even number of section signals) may be adopted or the processing corresponding to the second example (for forming the unit interpolation signal portion part with an odd number of section signals) may be adopted. In an example shown in FIG. 26, the unit interpolation signal portion part is formed by three (an odd number) section signals as in the second example.

First, the pre-interpolation signal is generated by processing same as the processing shown in FIG. 24 corresponding to the second example. In (c) of FIG. 26, a signal in the vicinity of a boundary between an end portion of the pre-interpolation signal and a start portion of the post-interpolation signal is shown as an original interpolation signal.

In a state shown in (c) of FIG. 26, first, the section signal N−1 immediately preceding the last section signal in the pre-noise original signal section Ts1 is arranged in order of the forward time direction, the reverse time direction, and the forward time direction as the end portion of the pre-interpolation signal, whereby one unit interpolation signal portion part is formed.

The next half pitch section is a section corresponding to a boundary between the pre-interpolation signal and the post-interpolation signal. A half pitch section following the half pitch section is a section of the post-interpolation signal. As shown in the figure, the second section signal N+2 in the post-noise original signal section Ts2 is arranged in order of the forward time direction, the reverse time direction, and the forward time direction for each of the half pitch sections. Thereafter, each of the third and subsequent sections is sequentially arranged in the half pitch section in order of the forward time direction, the reverse time direction, and the forward time direction. When this arrangement is performed to the last section signal in the post-noise original signal section Ts2, the post-interpolation signal is formed to the end thereof.

Then, as shown in (b) of FIG. 26, a connecting portion comb for one half pitch period section is provided between the last unit interpolation signal portion part in the pre-interpolation signal and the first unit interpolation signal portion part in the post-interpolation signal.

In the connecting portion comb, a sound signal obtained by cross-fading the last section signal N in the pre-noise signal source section Ts1 and the first section signal N+1 in the post-noise original signal section Ts is arranged. The cross fade in this case is performed such that the section signal N increases at 0% to 100% and the section signal N+1 is attenuated at 100% to 0%. Consequently, in a boundary between the immediately preceding half pitch section and the half pitch section of the cross fade, point-connection of an end position of the section signal N−1 in the forward time direction and a start position of the section signal N in the forward time direction is obtained. In a boundary between the half pitch section of the cross fade and the immediately following half pitch section, point-connection of an end position of the section signal N+1 in the forward time direction and a start position of the section signal N+2 in the forward time direction is obtained.

As a simplest method of generating an original interpolation signal using the pre-interpolation signal and the post-interpolation signal, the post-interpolation signal formed by only connection of the unit interpolation signal portion part only has to be connected following the pre-interpolation signal also formed by only connection of the unit interpolation signal portion part. In other words, the original interpolation signal has a structure obtained by removing the connecting portion comb from (b) of FIG. 26 and connecting the pre-interpolation signal and the post-interpolation signal. However, in such an original interpolation signal, it is difficult to obtain point-connection in the end position of the pre-interpolation signal and the start position of the post-interpolation signal. Therefore, in the example shown in FIG. 26, the connecting portion comb is provided as explained above.

In the processing for generating the pre-interpolation signal and the post-interpolation signal, as in the pitch-based interpolation signal generation processing of the second example, the input sound signal in the post-noise original signal section is expanded to three times the size thereof. Therefore, time width one third as large as the pre-interpolation signal section Tn−1 only has to be set for the pre-noise original signal section Ts1. Similarly, time width one third as large as the post-interpolation signal section Tn−2 only has to be set for the post-noise original signal section Ts2.

The original interpolation signal is generated by connecting the pre-interpolation signal and the post-interpolation signal in this way. This makes it possible to keep high continuity between the interpolation signal and the input sound signals before and after the interpolation signal as in the case of the noise reducing device as the second example. Nevertheless, it is naturally likely that a change occurs in a pitch of the input sound signal before and after the noise occurrence period Tn. However, in particular, the pitch-based interpolation signal generation processing of the third example can cope with such a change in a pitch period before and after the noise occurrence period and keep higher continuity. Therefore, more natural audibility can be expected.

In the case of the third example, there is also an advantage that, in the noise occurrence period Tn having the same time width, the pre-noise original signal section Ts1 and the post-noise original signal section Ts2 can be set shorter than the pre-noise original signal section Ts1 shown in FIG. 22 of the second example.

7. Configuration Example (Fourth Example) of the Noise Reducing Device

Figure 21:
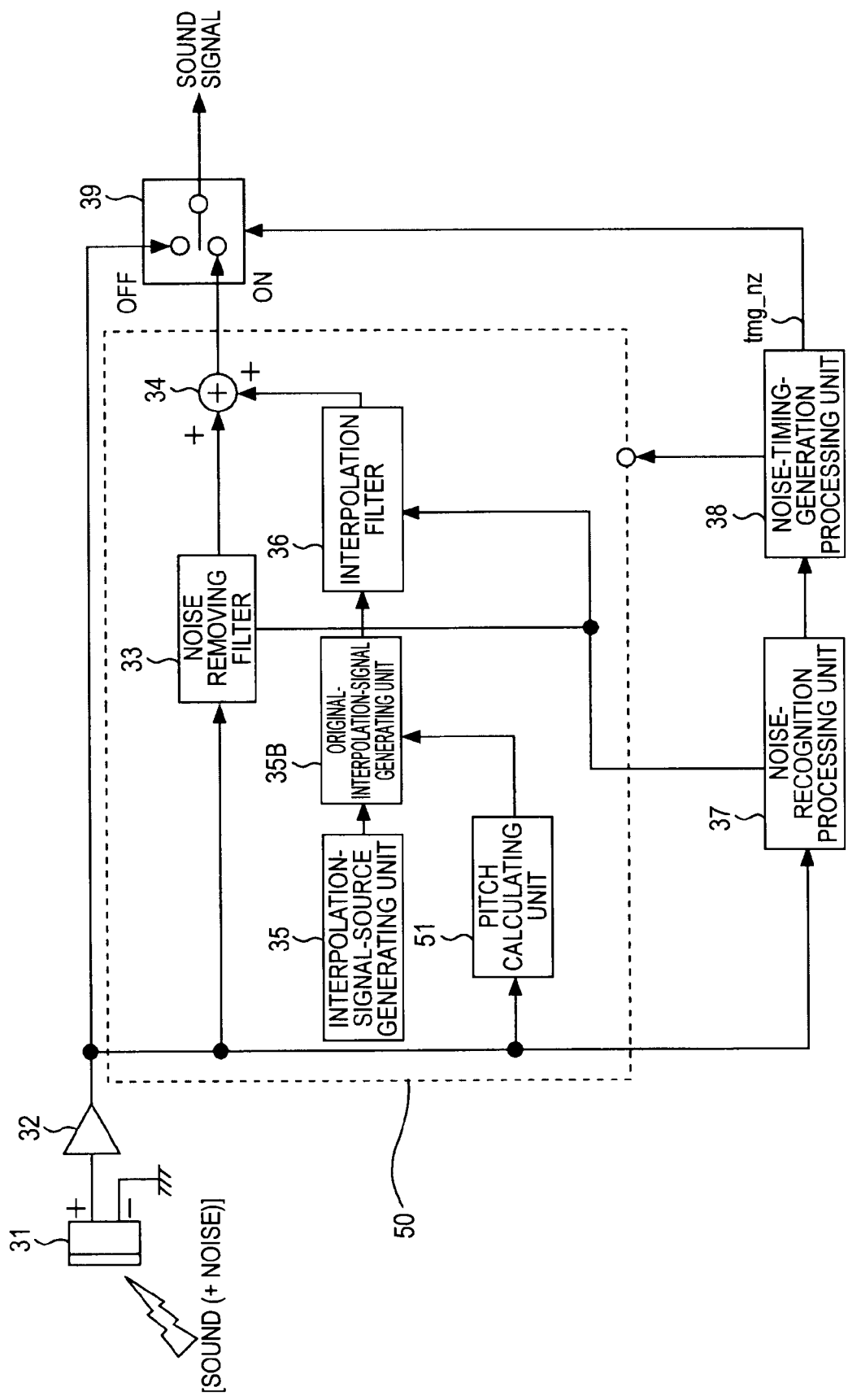
FIG. 21 is a block diagram of a configuration example of a noise reducing device (a fourth example) according to the embodiment.

FIG. 21 is a diagram of a configuration example of a noise reducing device as a fourth example.

In the figure, components same as those shown in FIG. 14 as the first example are denoted by the same reference numerals and signs and explanation of the components is omitted. The configuration shown in FIG. 21 is the same as that of the first example shown in FIG. 14 in that an interpolation signal is generated on the basis of the interpolation signal source (the sound signal in use) generated by the interpolation signal source generating unit 35 rather than on the basis of the input sound signal.

In FIG. 21, the pitch calculating unit 51 and an interpolation-signal generating unit 35C are provided in addition to the configuration shown in FIG. 14.

In the figure, as in FIG. 20, the section including the noise removing filter 33, the adder 34, the interpolation-signal-source generating unit 35, the original-interpolation-signal generating unit 35C, the interpolation filter 36, and the pitch calculating unit 51 is represented as noise removal and interpolating unit 50. The noise-timing-generation processing unit 38 outputs noise recognition information to the noise removing and interpolating unit 50.

The pitch calculating unit 51 adopts a configuration same as that of the noise reducing device of the third example shown in FIG. 20. The pitch calculating unit 51 calculates a pitch for the input sound signal from the amplifier 32 and outputs information indicating the calculated pitch to the original-interpolation-signal generating unit 35C.

The original-interpolation-signal generating unit 35C receives the input of an interpolation signal source as a generation source signal for an interpolation signal and generates an original interpolation signal as explained below on the basis of the calculated pitch of the input sound signal.

The noise reducing device as the fourth example can perform processing according to all of the first to third examples as pitch-based interpolation signal generation processing.

When pitch-based interpolation signal generation processing according to the first and second example is performed, the pitch calculating unit 51 is configured to execute processing same as that shown in FIG. 22. Specifically, the pitch calculating unit 51 calculates a pitch using one of the input sound signals before and after the noise occurrence period Tn. When pitch-based interpolation signal generation processing according to the third example is performed, the pitch calculating unit 51 is configured to execute processing same as that shown in FIG. 25.

First, the pitch-based interpolation signal generation processing according to the first example is explained.

The original-interpolation-signal generating unit 35C in this case extracts a sound signal having time width two third as large as the noise occurrence period Tn from a sound signal as an interpolation signal source. This is equivalent to processing for setting the pre-noise original signal section Ts1 in FIG. 22 and extracting a sound signal in the pre-noise original signal section Ts1. However, the interpolation signal source is a continuously-generated sound signal. Unlike the input sound signal, noise is not mixed in the interpolation signal source. Therefore, timing for extracting the sound signal having the time width two third times as large as the noise occurrence period Tn from the interpolation signal source may be arbitrary.

The original-interpolation-signal generating unit 35C divides the interpolation signal source into section signals of the half pitch period, generates an original interpolation signal having time width of the noise generation period Tn according to processing same as that explained with reference to FIG. 23, and outputs the original interpolation signal to the interpolation filter 36.

When the pitch-based interpolation signal generation processing according to the second example is performed, the original-interpolation-signal generating unit 35C extracts a sound signal having time width one third as large as the noise occurrence period Tn from the sound signal as the interpolation signal source at arbitrary timing.

Then, the original-interpolation-signal generating unit 35C divides the interpolation signal source into section signals of the half pitch period, generates an original interpolation signal having time width of the noise generation period Tn according to processing same as that explained with reference to FIG. 24, and outputs the original interpolation signal to the interpolation filter 36.

When the pitch-based interpolation signal generation processing according to the third example is performed, the original-interpolation-signal generating unit 35C extracts a sound signal having time width one third as large as the pre-interpolation signal period Tn−1 (same as the pre-noise original signal section Ts1 shown in FIG. 25) from the sound signal as the interpolation signal source at arbitrary timing and sets the sound signal as a pre-noise original signal. Similarly, the original-interpolation-signal generating unit 35C extracts a sound signal having time width one third as large as the post-interpolation signal period Tn−2 (same as the post-noise original signal section Ts2 shown in FIG. 25) from the sound signal as the interpolation signal source at arbitrary timing and sets the sound signal as a post-noise original signal.

Then, the original-interpolation-signal generating unit 35C divides the pre-noise original signal and the post-noise original signal into section signals of the half pitch period and generates an original interpolation signal according to processing same as that shown in FIG. 26.

In the case of the noise reducing device of the fourth example, the original interpolation signal generated by the pitch-based interpolation signal generation processing is not the input sound signal but the interpolation signal source, i.e., a sound signal obtained by combining, for example, a tone signal and an M-sequence signal.

However, even when interpolation is performed with a signal different from such an input sound signal, an original interpolation signal is generated according to the processing on the basis of a pitch of the input sound signal. Consequently, compared with, for example, a case in which the interpolation signal source is simply connected in the forward time direction to generate the original interpolation signal, more natural audibility is obtained. The inventor confirmed this through an experiment.

Each of the noise reducing devices of the third and fourth examples (FIGS. 20 and 21) that execute the pitch-based interpolation signal generation processing (the first to third examples) includes the noise removing filter 33 and the interpolation filter 36. Therefore, in the noise occurrence period, only a divided frequency at which noise occurs is removed from the input sound signal and a divided frequency at which noise does not occur is left to generate a noise-removed signal. Then, the noise-removed signal is interpolated by an interpolation signal having a band characteristic including only the removed divided frequency. Consequently, as explained above, components of the input sound signal in the noise occurrence period are left as much as possible to improve continuity of the input sound signal with the periods before and after the noise occurrence period.

However, concerning the pitch-based interpolation signal generation processing (the first to third examples), in the noise occurrence period, it is also possible to remove all bands of the input sound signal and, instead, interpolate an interpolation signal having a band characteristic same as that of all the bands.

Even when such a method of noise removal and interpolation is adopted, the interpolation signal itself is generated by processing as the pitch-based interpolation signal generation processing (the first to third examples) shown in FIGS. 23, 24, and 26. Therefore, for example, waveforms are point-connected for each of the half pitch period sections and occurrence of a harmonic is suppressed and occurrence of a level fall due to a phase condition is eliminated because a cross-fade period is short or there is no cross-fade period. These advantages are effectively obtained.

In the configurations shown in the figures as the noise reducing devices of the examples according to this embodiment, the components including the amplifier 32 at the post-stage of the microphone 31 can be configured by hardware. The components can be configured as a DSP (Digital Signal Processor). In other words, the components can be configured by a computer program (an instruction) that should be given to the hardware serving as the DSP. The components can be realized as a computer program executed by a CPU (Central Processing Unit). The components can be configured by appropriately selecting and combining at least two of the hardware, the DSP, and the computer program of the CPU.

The computer program is stored in an auxiliary storage device that can be configured by a ROM, a HDD, a flash memory, or the like of the noise reducing device. Besides, the computer program can be stored in, for example, a removable storage medium. The computer program can also be stored in a server or the like on a network and, for example, downloaded through a network to enable a user to acquire the computer program.

Examples of apparatuses to which the noise reducing devices of the examples according to this embodiment are applied include recording and reproducing apparatuses having microphones and capable of recording collected sound in recording media such as a video camera apparatus, a digital still camera having a recording function, a cellular phone apparatus, and an IC recorder. In such apparatuses, it is necessary to remove noise from, for example, sound collected by the microphone on nearly a real-time basis and record the sound. The configuration of the noise reducing device according to this embodiment is useful in performing noise determination and noise removal while keeping a real-time nature in this way.

However, a sound source that could include noise sound input by the noise reducing device according to this embodiment is not limited to the sound collected by the microphone. The sound may be a sound signal obtained by reading out sound already recorded in the recording medium. In other words, a sound-signal input unit for obtaining an input sound signal is not limited to a sound input system including the microphone.

The present application contains subject matter related to that disclosed in Japanese Priority Patent Application JP 2009-097189 filed in the Japan Patent Office on Apr. 13, 2009, the entire contents of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A noise reducing device comprising:
  a sound-signal input unit that inputs a sound signal captured by an electronic apparatus;
  a time-to-frequency converting unit that converts the input sound signal obtained by being input by the sound-signal input unit into a frequency signal;
  a patterning unit that calculates, for each of divided frequencies of the frequency signal, an nth order polynomial (n is a natural number) as a polynomial for interpolating sampling points and acquires a coefficient pattern including a set of values of coefficients of respective orders of the polynomial;
  a matching-data storing unit that stores, in association with the divided frequencies, matching data indicating a matching range as a range of a coefficient pattern regarded as noise, the matching data generated from a predetermined noise definition profile corresponding to noise generated from one or more components of the electronic apparatus; and a noise determining unit that determines, on the basis of a result obtained by comparing the coefficient pattern acquired by the patterning unit and the matching range indicated by the matching data, at least presence or absence of noise occurrence at a divided frequency corresponding to data of the compared coefficient pattern.

2. The noise reducing device according to claim 1, wherein the patterning unit executes, concerning the polynomial, normalization corresponding to a time direction such that an x coordinate value at an extreme value of the polynomial is 0.

3. The noise reducing device according to claim 2, wherein the patterning unit executes, concerning the polynomial, normalization corresponding to an amplitude direction such that a y coordinate value as an extreme value of the polynomial is an integer value.

4. The noise reducing device according to any one of claims 1 to 3, wherein the noise determining unit calculates, according to determination that noise is present, on a curve of the polynomial, a first tangent passing an x coordinate having a value smaller than an x coordinate at an extreme value and a second tangent passing an x coordinate having a value larger than the x coordinate at the extreme value, sets, as a noise occurrence start point, time corresponding to an x coordinate value at the time when the first tangent crosses a y coordinate value set as a threshold, and sets, as a noise occurrence end point, time corresponding to an x coordinate value at the time when the second tangent crosses the y coordinate value set as the threshold.

5. The noise reducing device according to claim 1, further comprising:

a peak determining unit that determines, from the frequency signal, a sampling point at which amplitude of the frequency signal is at a peak, wherein the polynomial calculating unit calculates the polynomial for a divided frequency at which the sampling point is determined as having the peak by the peak determining unit.

6. The noise reducing device according to claim 5, wherein the peak determining unit maps absolute amplitudes of the sampling points as the frequency signal in a two-dimensional direction including a frequency axis and a time axis and determines the sampling point at the peak on the basis of a distribution state of the mapped absolute amplitudes.

7. The noise reducing device according to claim 1, wherein the matching-data storing unit stores the matching data in association with a divided frequency corresponding to only a frequency band in which noise is determined as occurring.

8. The noise reducing device according to claim 1, further comprising:

a noise-removing filter unit that sets a pass band characteristic for interrupting only a divided frequency at which noise is determined as present by the noise determining unit and allows the input sound signal to pass to thereby output a sound signal from which noise is removed;

an interpolation-signal generation unit that generates an interpolation signal including only a band component of the divided frequency at which noise is determined as present by the noise determining unit; and a combining unit that outputs a sound signal obtained by combining the sound signal from which noise is removed and the interpolation signal.

9. The noise reducing device according to claim 8, wherein the interpolation-signal generating unit includes:

an original-interpolation-signal generating unit that extracts, from the input sound signal, a pre-sound signal in a section before a noise occurrence period, which is recognized on a determination result of the noise determining unit, on a time axis and a post-sound signal in a section after the noise occurrence period on the time axis and connects the post-sound signal behind the pre-sound signal to thereby generate an original interpolation signal having time width corresponding to the noise occurrence period, and an interpolation filter unit that sets a pass band characteristic for allowing only a divided frequency at which noise is determined as present by the noise determining unit to pass to thereby generate the interpolation signal.

10. The noise reducing device according to claim 9, wherein the original-interpolation-signal generating unit extracts the pre-sound signal in time width from a start point of a noise occurrence period recognized on the basis of a determination result of the noise determining unit to a peak point when amplitude is at a peak in the noise occurrence period and extracts the post-sound signal in time width from the peak point to an end point of the noise occurrence period recognized on the basis of the determination result of the noise determining unit.

11. The noise reducing device according to claim 8, wherein the interpolation-signal generating unit includes an interpolation filter that extracts, from the input sound signal, a pre-sound signal having time width for a noise occurrence period in a section before the noise occurrence period, which is recognized on the basis of a determination result of the noise determining unit, on a time axis or a post-sound signal having the time width for the noise occurrence period in a section after the noise occurrence period on the time axis and sets the pre-sound signal and the post-sound signal as an original interpolation signal, sets a pass band characteristic for allowing only a divided frequency at which noise is determined as present by the noise determining unit to pass, and allows the original interpolation signal to pass to thereby generate the interpolation signal.

12. The noise reducing device according to claim 8, wherein the interpolation-signal generating unit includes:

an interpolation-signal-source generating unit that generates an interpolation signal source as a sound signal not based on the input of the input sound signal, and an interpolation filter unit that sets a pass band characteristic for allowing only a divided frequency at which noise is determined as present by the noise determining unit to pass and allows a sound signal as the interpolation signal source to pass to thereby generate the interpolation signal.

13. The noise reducing device according to claim 1, further comprising:

a correlation-degree calculating unit that calculates a correlation degree between a pattern of the frequency signal and a pattern of a frequency signal treated as noise, wherein the noise determining unit determines at least presence or absence of the noise occurrence on the basis of a result obtained by comparing the coefficient pattern data acquired by patterning unit and the matching range indicated by the matching data and the correlation degree.

14. A noise reducing device according to claim 1, further comprising:

a switching unit that receives input of a sound signal output from a combining unit and the input sound signal, outputs the sound signal output from the combining unit in a noise occurrence period recognized on the basis of a determination result of the noise determining unit, and outputs the input sound signal in a noise non-occurrence period recognized on the basis of a determination result of the noise determining unit.

15. The noise reducing device according to claim 14, wherein the switching unit executes cross-fade processing such that, in a start period in the noise occurrence period, a level of the sound signal output from the combining unit is gradually increased and a level of the input sound signal is gradually attenuated and, in an end period in the noise occurrence period, the level of the sound signal output from the combining unit is gradually attenuated and the level of the input sound signal is gradually increased.

16. A noise determining method comprising the steps of:
inputting a sound signal captured by an electronic apparatus;
converting the input sound signal obtained by being input in the inputting step into a frequency signal;
calculating, for each of divided frequencies of the frequency signal, an nth order polynomial (n is a natural number) as a polynomial for interpolating sampling points and acquiring a coefficient pattern including a set of values of coefficients of respective orders of the polynomial;
storing, in association with the divided frequencies, matching data indicating a matching range as a range of a coefficient pattern regarded as noise, the matching data generated from a predetermined noise definition profile corresponding to noise generated from one or more components of the electronic apparatus; and
determining, on the basis of a result obtained by comparing the coefficient pattern acquired in the patterning step and the matching range indicated by the matching data, at least presence or absence of noise occurrence at a divided frequency corresponding to data of the compared coefficient pattern.

* * * * *